J. H. BARR.
COMPUTING MACHINE.
APPLICATION FILED AUG. 5, 1915.

1,311,373.

Patented July 29, 1919.
13 SHEETS—SHEET 1.

Witnesses:
J. Massey
Paul H. Franke

Inventor
John H. Barr
By his Attorney
H. M. Marble

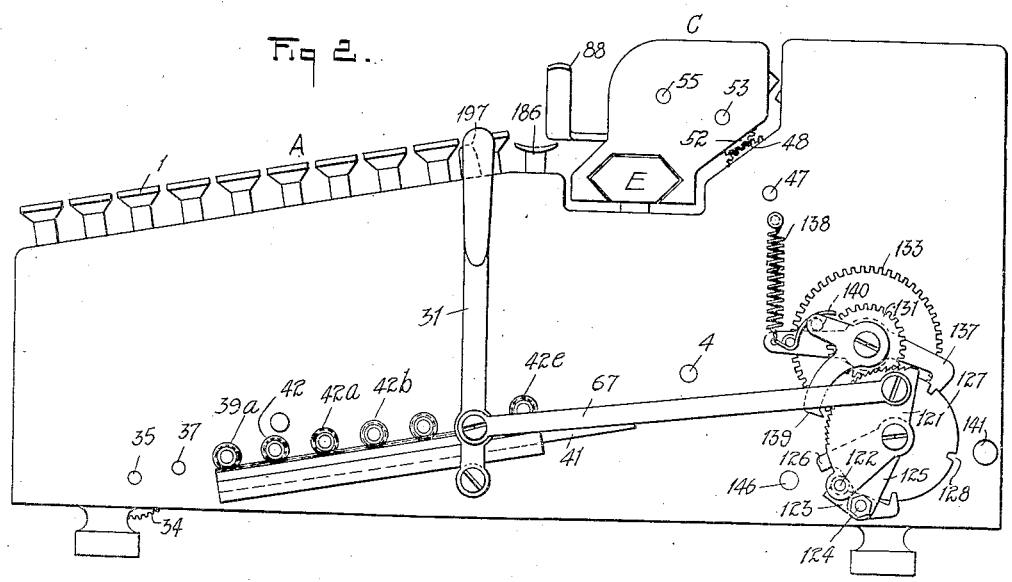

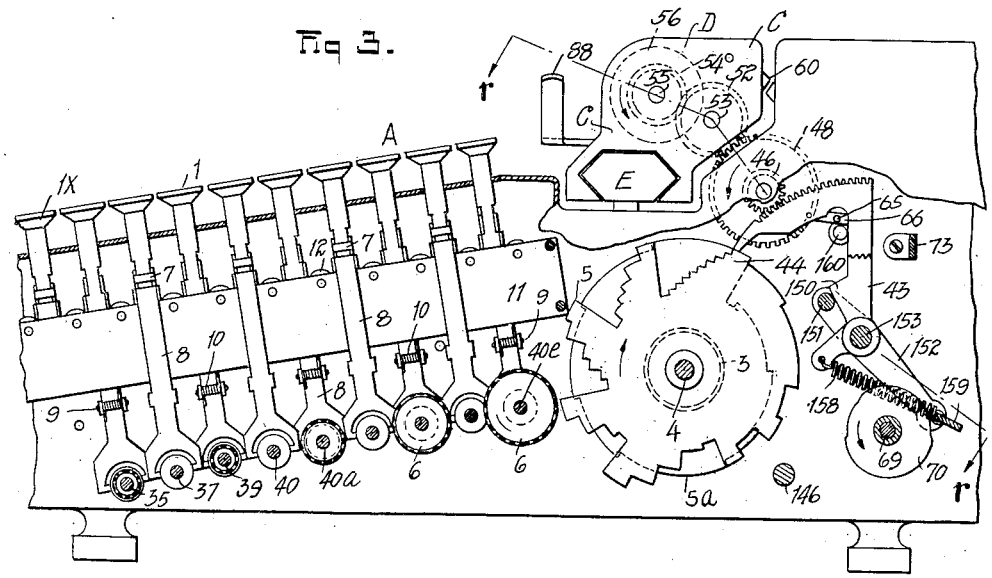

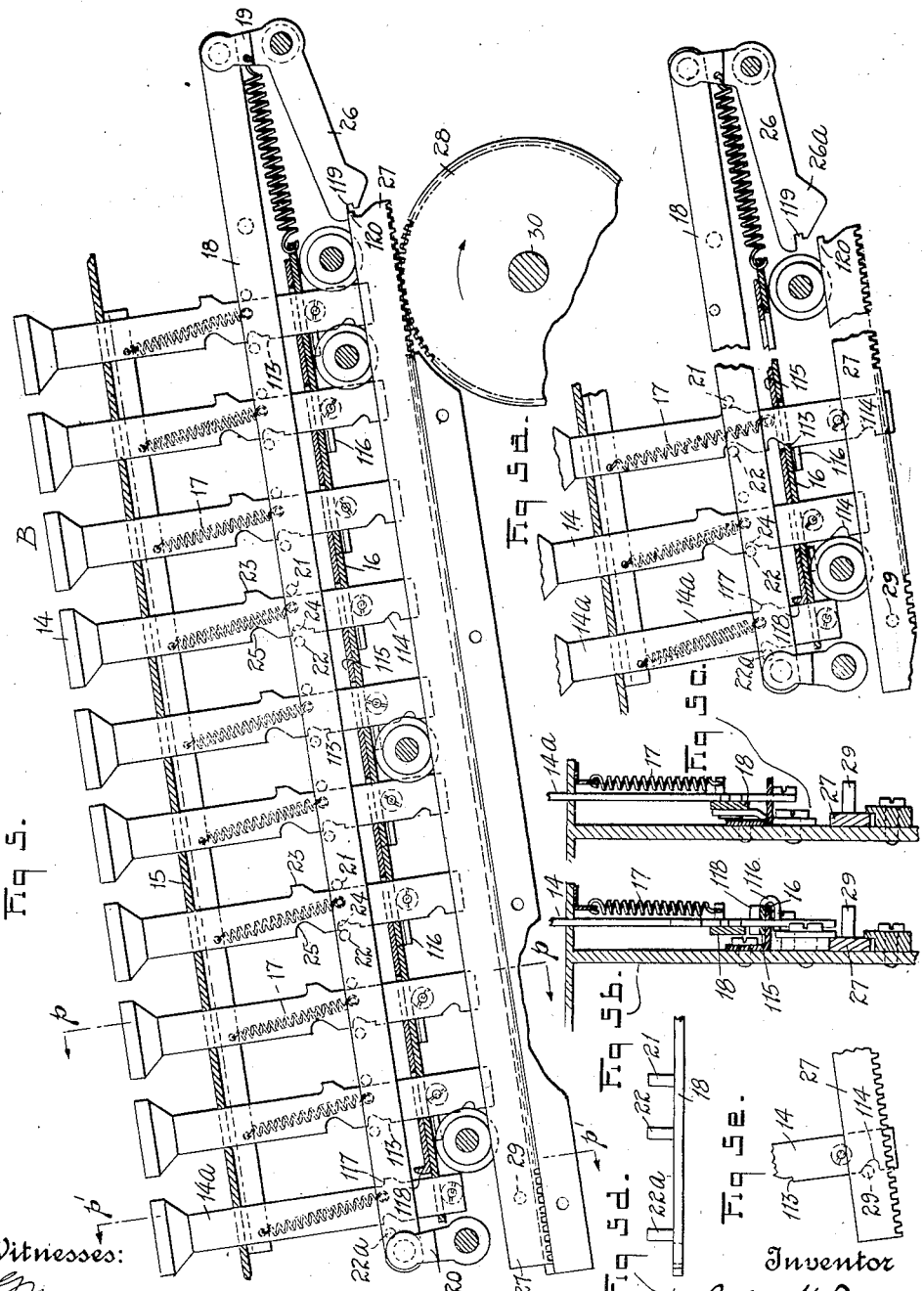

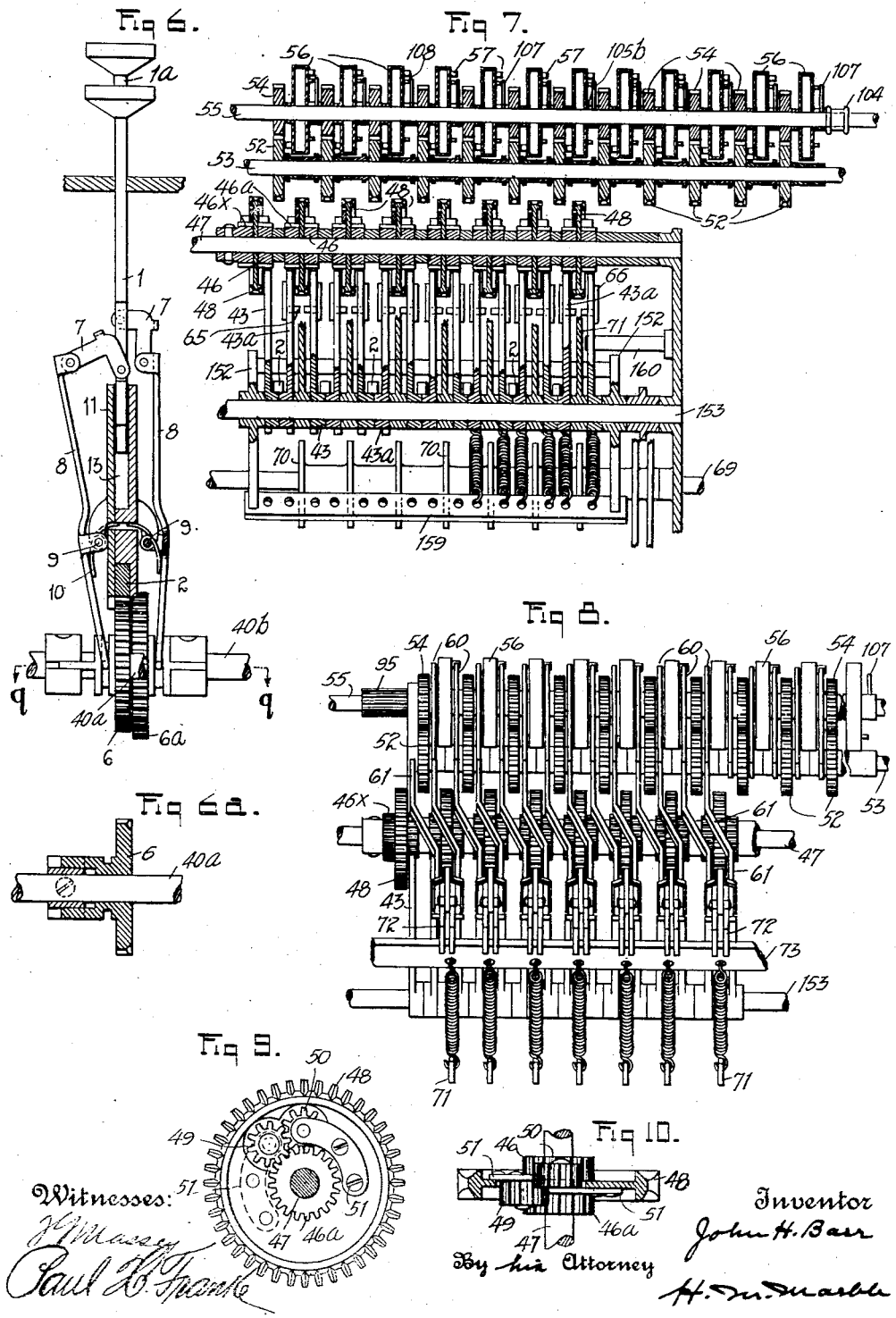

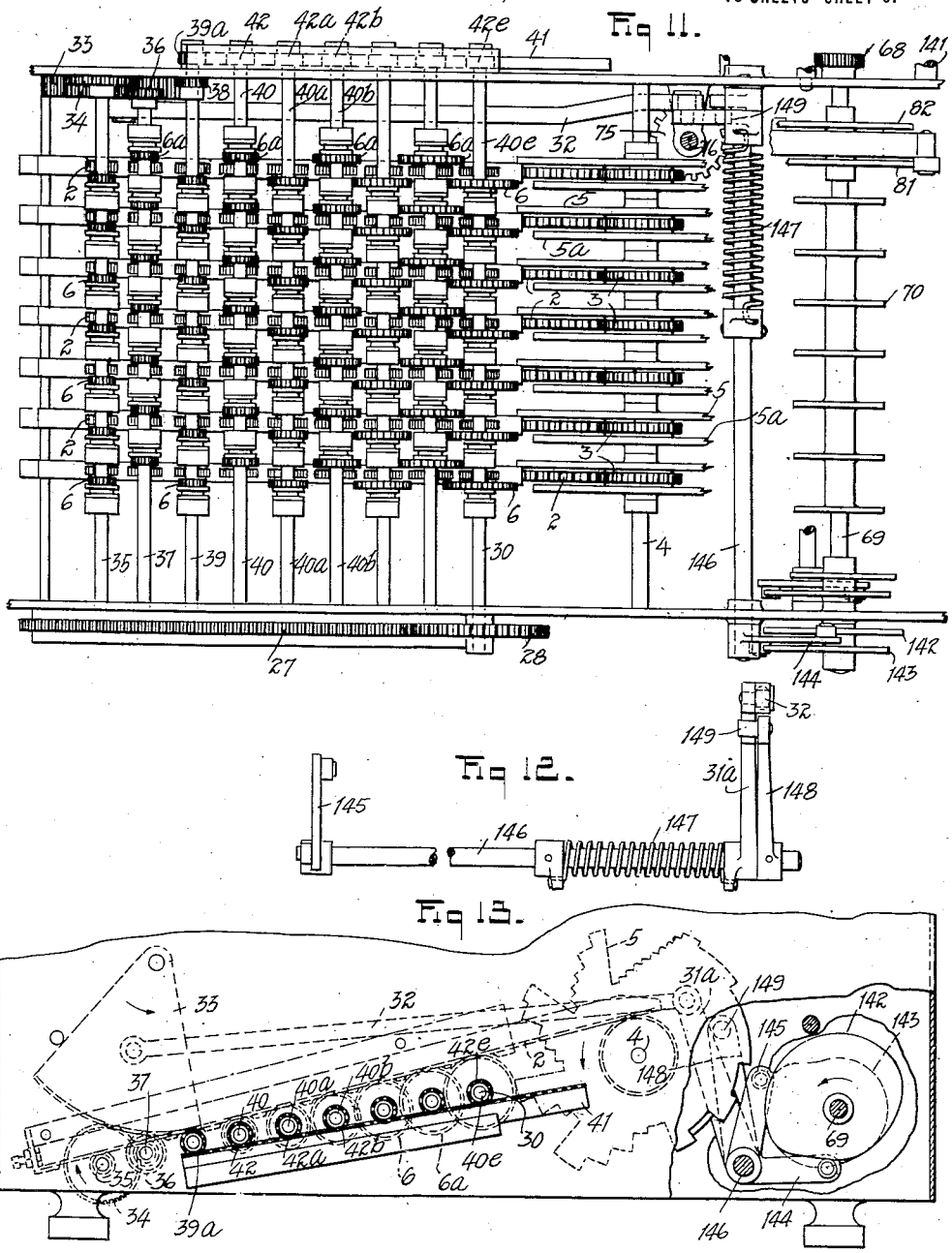

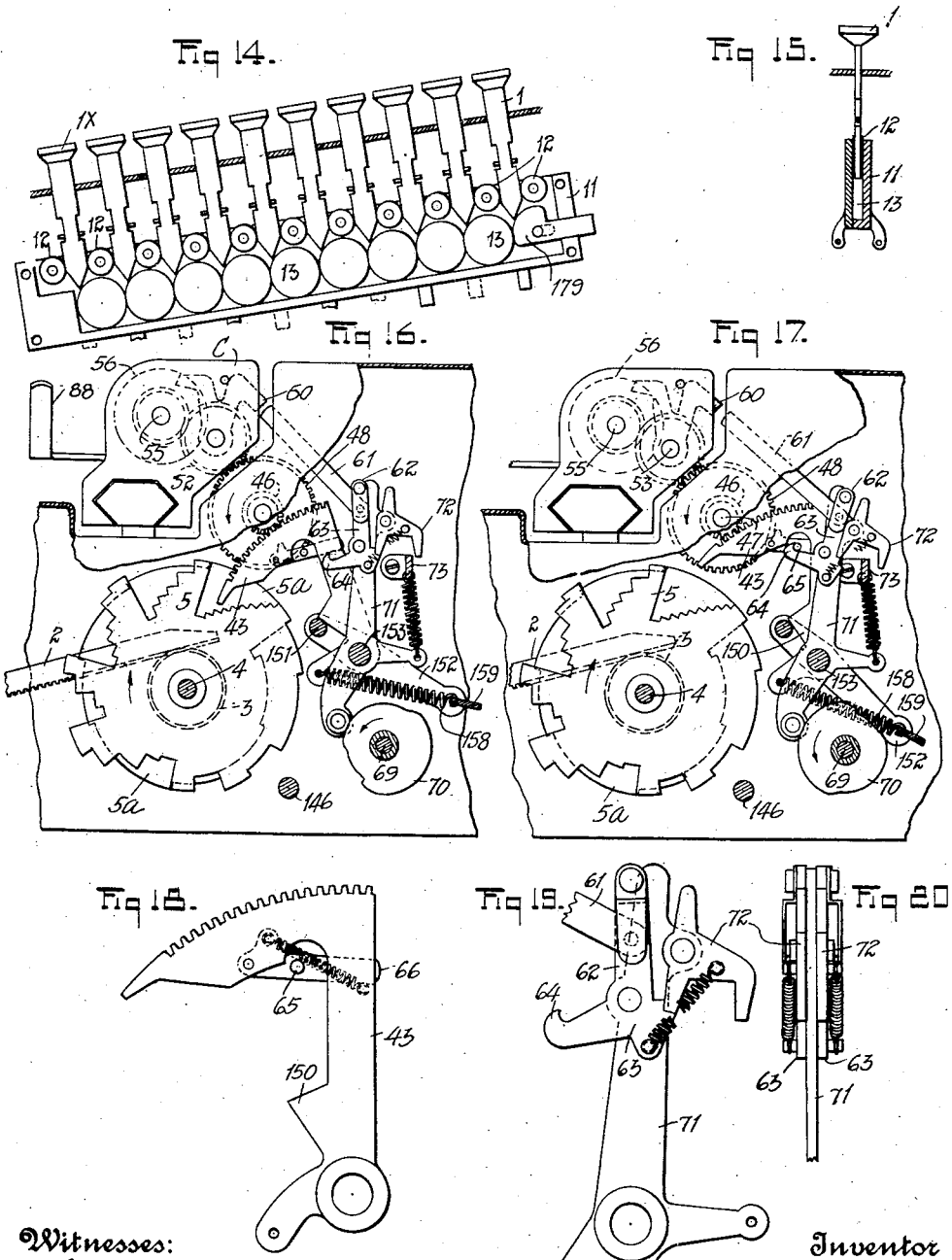

J. H. BARR.
COMPUTING MACHINE.
APPLICATION FILED AUG. 5, 1915.
1,311,373.
Patented July 29, 1919.
13 SHEETS—SHEET 8.
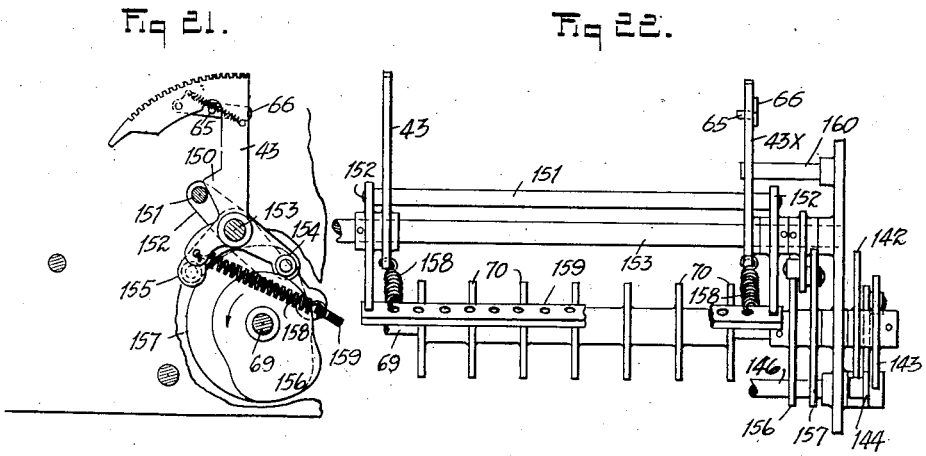
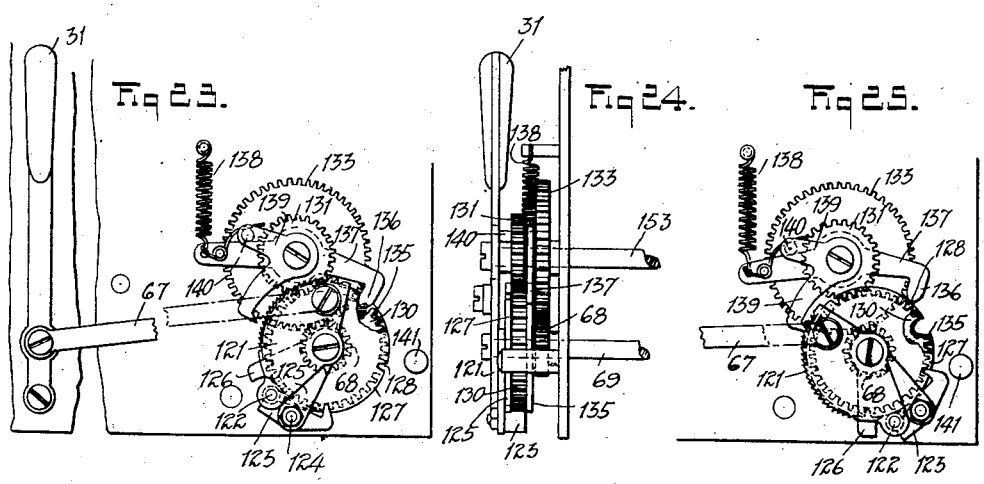
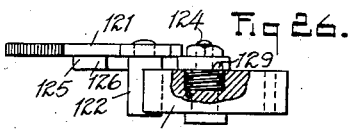

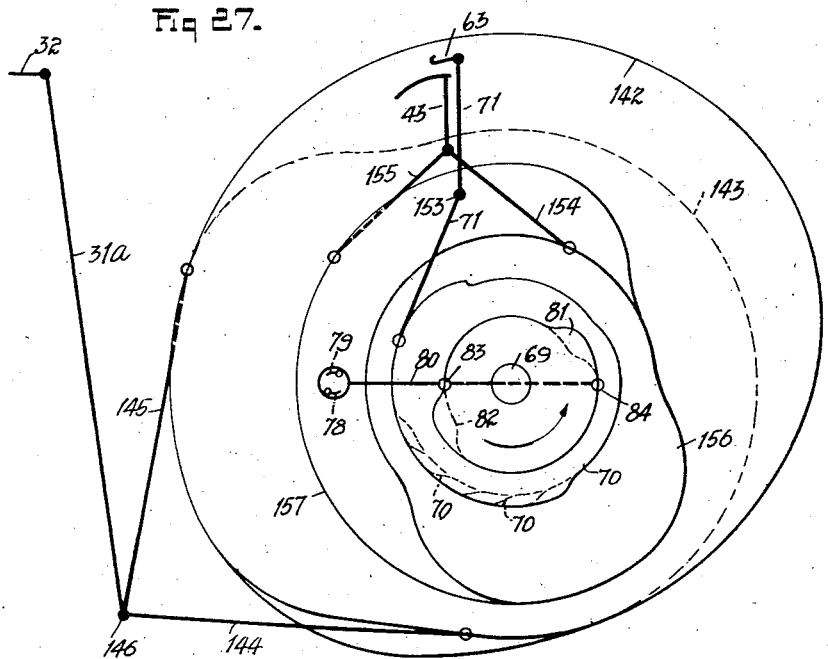

J. H. BARR.
COMPUTING MACHINE.
APPLICATION FILED AUG. 5, 1915.
1,311,373.  Patented July 29, 1919.
13 SHEETS—SHEET 10.
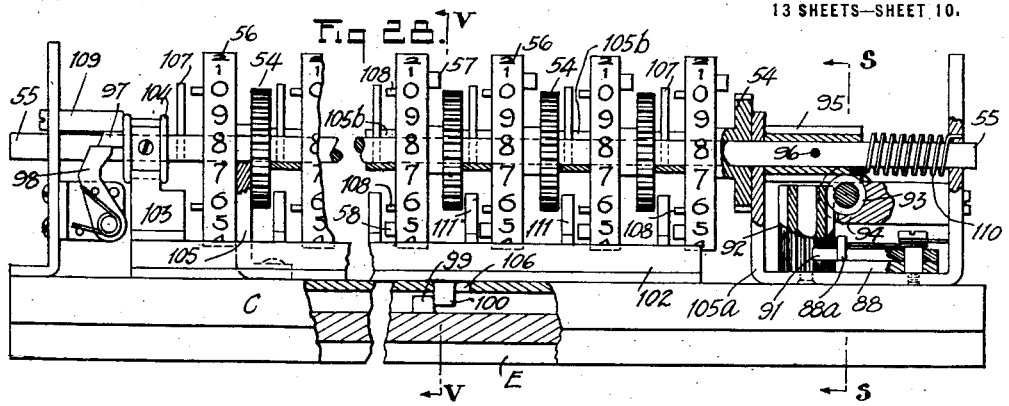
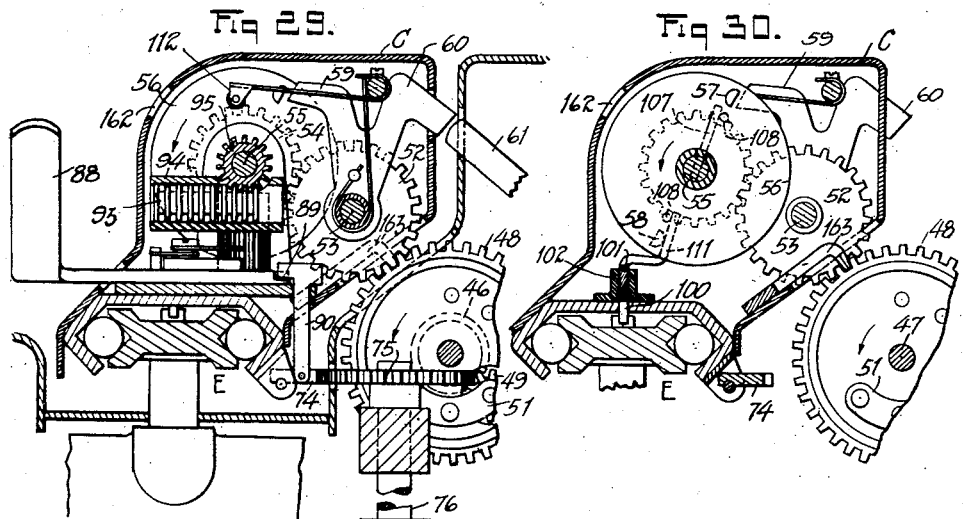
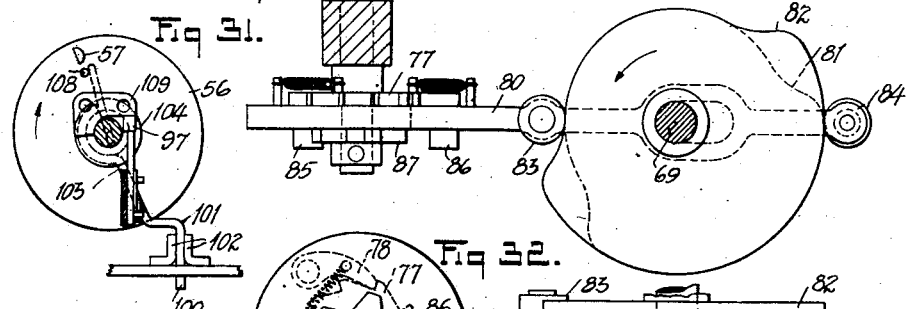
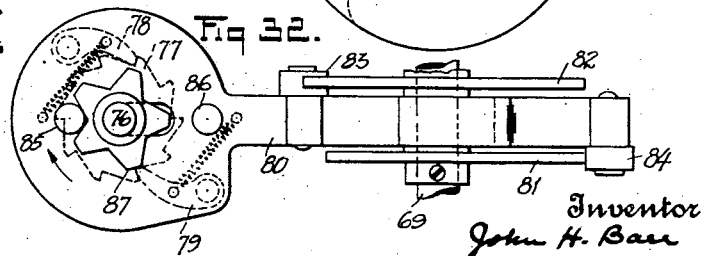

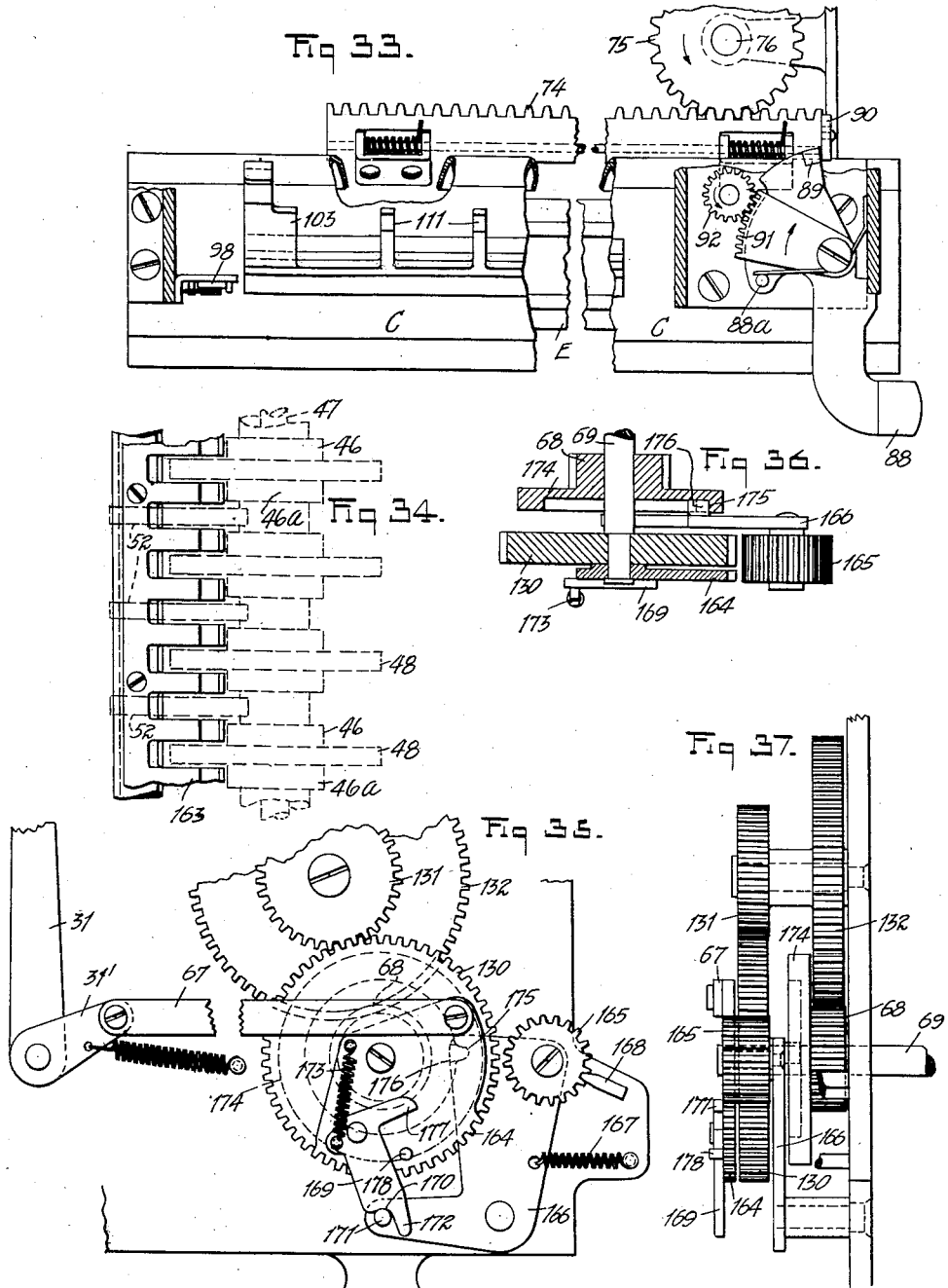

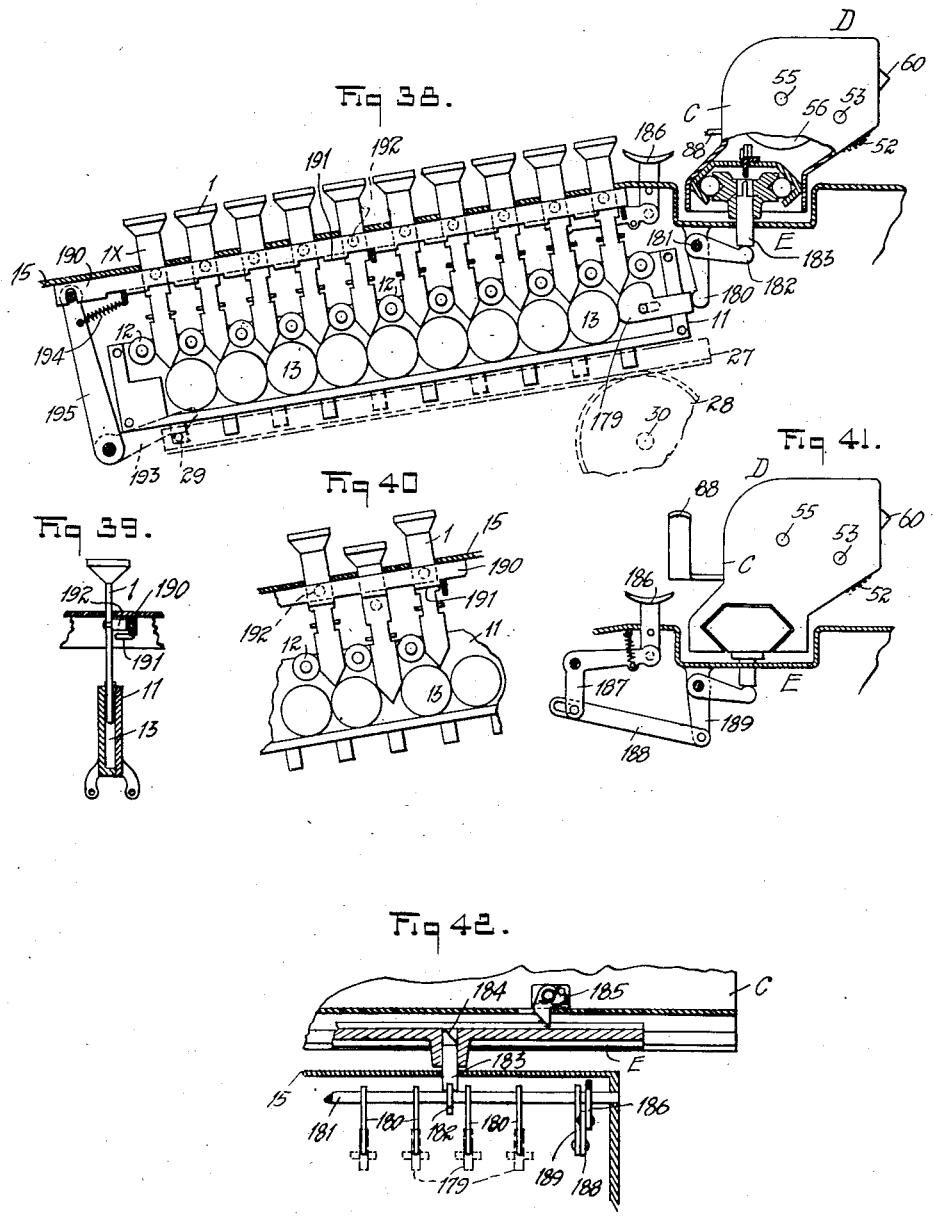

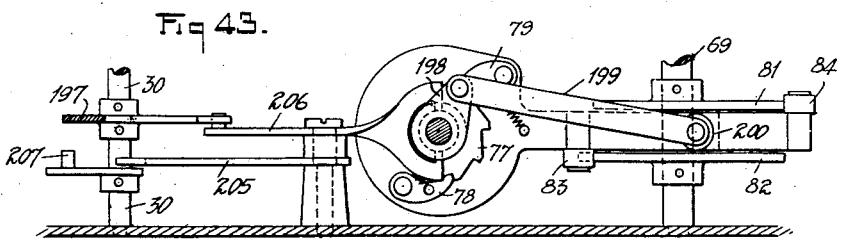
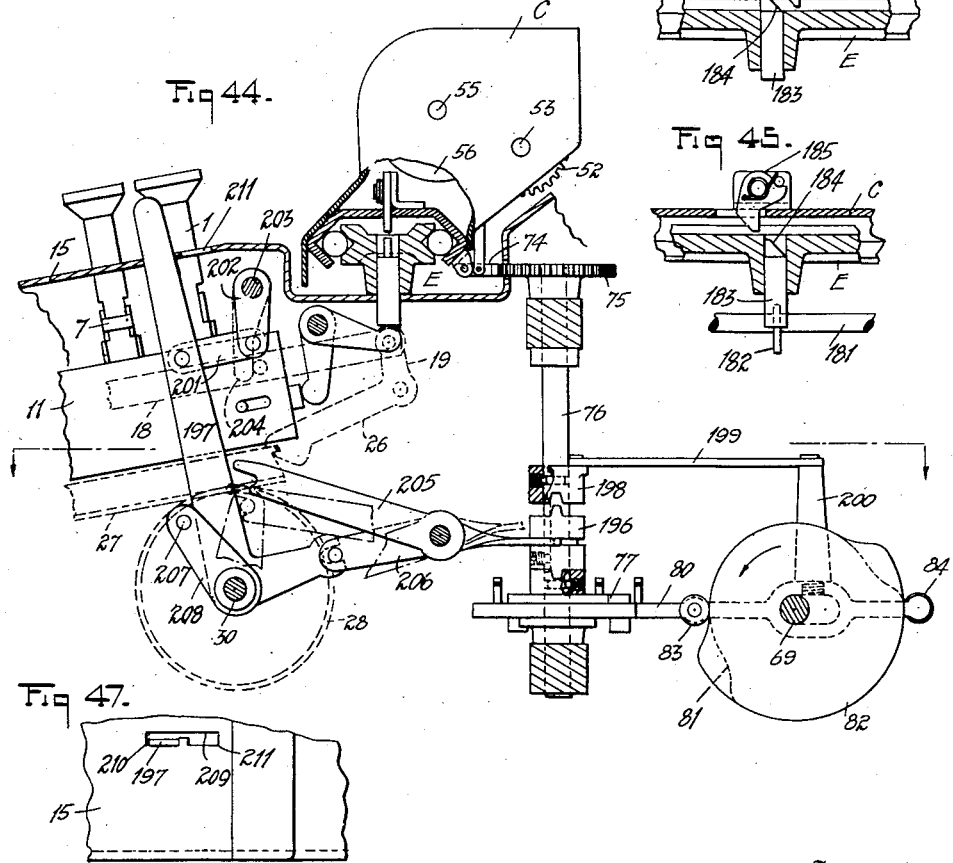

UNITED STATES PATENT OFFICE.

JOHN H. BARR, OF NEW YORK, N. Y.

COMPUTING-MACHINE.

1,311,373.      Specification of Letters Patent.      Patented July 29, 1919.

Application filed August 5, 1915. Serial No. 43,821.

*To all whom it may concern:*

Be it known that I, JOHN H. BARR, a citizen of the United States of America, and a resident of New York city, county and State of New York, have invented certain new and useful Improvements in Computing-Machines, of which the following is a specification.

My invention relates to computing machines, and particularly to multiplication machines, and comprises a machine of the keyboard type, wherein multiplication is performed by an operation, or series of operations, of a purely mechanical character, and without the use of logarithmetic scales, curves, cams, etc., and without successive operations of the same keys in any single multiplication operation, such as are required in certain types of machine which perform multiplication by a process of successive addition. The machine herein illustrated and described and embodying my invention comprises a multiplicand-receiving device, which is preferably a keyboard, comprising a plurality of columns of keys, so arranged that the multiplicand may be set up in this keyboard by depressing appropriate keys; and the machine also comprises a multiplier-receiving device, preferably consisting of a single column of keys, which may be operated successively according to the various digits contained in the multiplier. The machine further comprises a moving carriage carrying dial wheels or equivalent indicating devices which show the product when obtained; and the machine further comprises an operating lever and mechanism operated thereby whereby, after the depression of each multiplier key, the product of the multiplication of the previously set up multiplicand, by the multiplier digit corresponding to the multiplier key depressed, is obtained and transferred to the dial wheels; the carriage carrying such dial wheels being caused to move, after each multiplication by a multiplier digit, so that multiplication by the next multiplier digit will have an effect on the product dials corresponding to the column or place (*i. e.,* tens, hundreds, etc.) to which that multiplier digit belongs. The machine further comprises suitable clearing mechanism whereby after performance of any complete multiplying operation the machine may be restored to normal position, with the dials at zero, preparatory to the next multiplication operation. The construction of the machine is such that if the product of one multiplication is to be used as the multiplicand for a succeeding operation, such product multiplicand can be set up in the multiplicand keyboard before the dial wheels are cleared; and thereby occasion for noting down any product in order that, after clearing of the machine, it may be transferred as a multiplicand to the multiplicand keyboard, is obviated. The machine further comprises means whereby a mistake in the depression of any multiplicand key, or any multiplier key, may be corrected before actuating the operating lever by which the actual multiplication is effected. Other features of the machine will be pointed out hereinafter.

My invention comprises novel direct-acting multiplication mechanism; novel carrying or tens-transfer mechanism; novel means for giving due effect to the column or order of each multiplier digit; a novel "flexible" keyboard; and other features all as hereinafter described and particularly pointed out in the appended claims.

The objects of my invention are to provide a direct-acting multiplication machine wherein a multiplicand may be set up and then, by the operation of a multiplier device, (and by one operation only of that multiplier device for each digit of the multiplier), direct multiplication may be effected; to make such machine accurate, relatively simple, easy in action and free from liability to derangement; to provide simple means for giving to each multiplier digit an effect corresponding to the column in the multiplier to which that digit belongs, *i. e.,* to the order or place of that digit; to provide for a plurality of carrying operations from each dial wheel to the dial wheel next above or higher in order, as may and often will be required during multiplication by a single digit; to provide improved and simplified and accurate carrying or tens-transfer mechanism; to provide improved and simplified product-registering means; to provide an improved and simplified flexible keyboard; to provide means whereby a mistake in the depression of either a multiplicand key or a multiplier key may be corrected at any time before the actual multiplication has occurred; to so arrange the machine that a product of one multiplication may be transferred to the multiplicand keyboard, for further multiplication of that product, before the machine is cleared; to provide simple and accurate clearing means; and generally, to make the machine relatively light and compact, relatively simple, easy to operate; easy to understand; accurate; and free from liability to derangement. Other objects of my invention will appear hereinafter.

I will now proceed to describe my invention with reference to the accompanying drawings, and will then point out the novel features in claims. In the drawings:

Figure 1 shows a top view of a multiplying machine embodying my invention.

Fig. 1ª shows a transverse vertical section through the keyboards of the machine, and Fig. 1ᵇ is a fragmentary section, on a plane parallel to that of Fig. 1ª, showing one of the "zero" keys of the multiplicand keyboard.

Fig. 2 shows a side elevation of such machine, and Fig. 2ª is a front elevation thereof.

Fig. 3 shows a vertical section of the machine from front to rear on the section line m—m of Fig. 1, the carriage and upper rear portion of the machine being shown in side elevation; the keys shown being those for setting up the multiplicand.

Fig. 4 shows a vertical section from front to rear on the section line n—n of Fig. 1, the carriage and upper rear portion of the machine being shown in side elevation, and shows particularly rack bars controlled by the multiplicand keys; the multiplier keys being shown behind the plane of section; portions of the mechanism being omitted for clearness.

Figure 1:
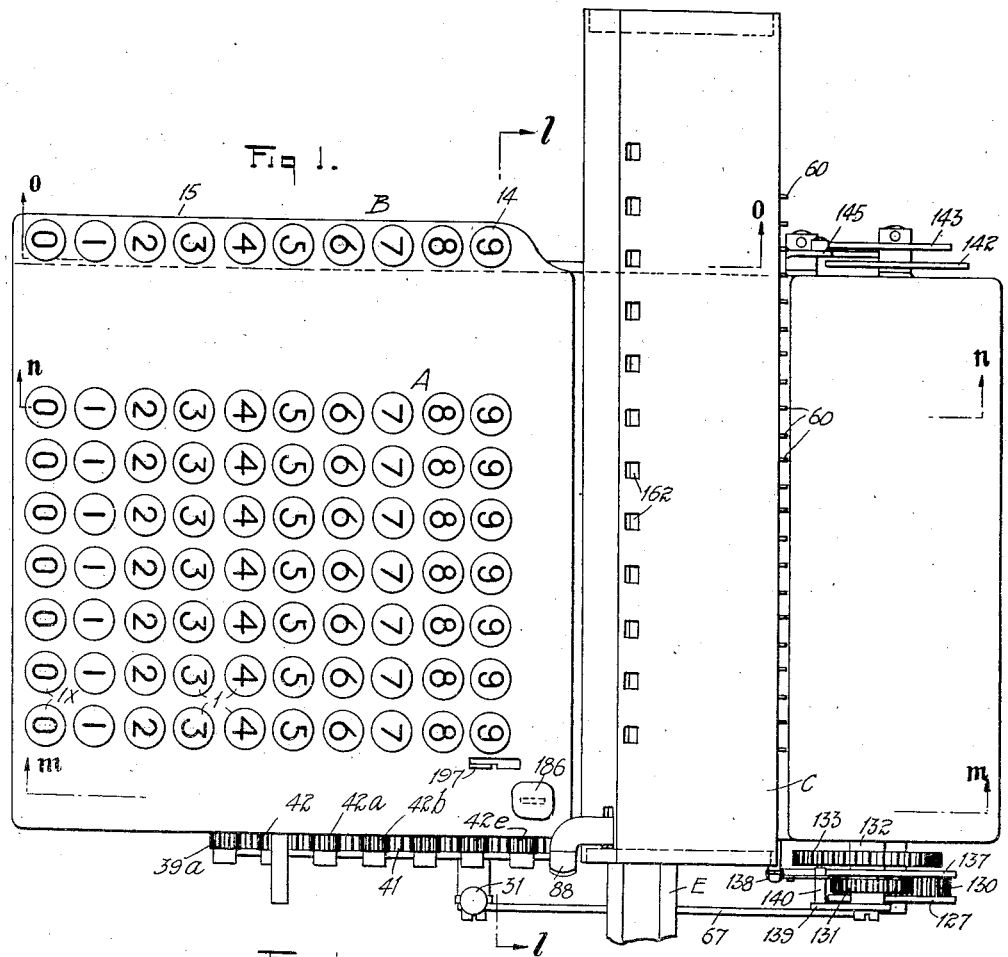
Figure 1A:
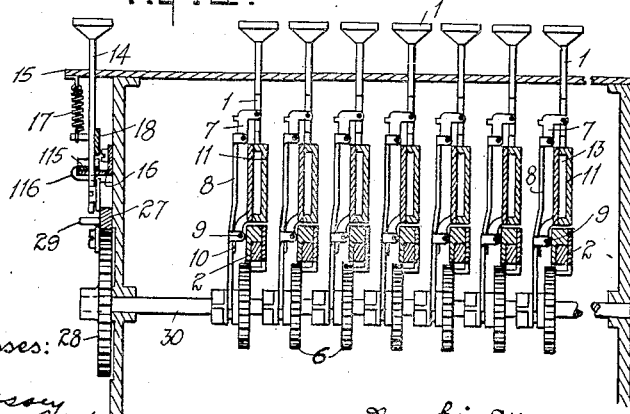
Figure 1B:
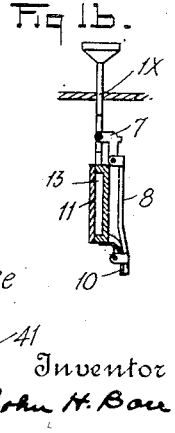

Fig. 5 shows a fragmentary transverse vertical section of the machine on the section line o—o of Fig. 1, i. e., is a vertical transverse section through the multiplier keyboard of the machine; Fig. 5ª is a fragmentary section on the same section line, showing one of the multiplier keys depressed; Fig. 5ᵇ shows a fragmentary transverse section on the line p—p of Fig. 5, and Fig. 5ᶜ shows a similar section on the line p'—p' of Fig. 5; Fig. 5ᵈ is a fragmentary top view of the bar 18; and Fig. 5ᵉ is a fragmentary side view of rack bar 27 and the lower portion of one of the multiplier keys when in depressed position.

Fig. 6 is a detail elevation and partial transverse vertical section, showing two of the multiplicand keys, one behind the other, and showing the rack bar which those keys control, and portions of the gear shift mechanism.

Fig. 6ª is a detail horizontal section on the section line q—q of Fig. 6.

Fig. 7 shows a detail section, looking from the rear of the machine, on the irregular section line r—r of Fig. 3, looking obliquely downward; that is to say, a section through the centers of the dial wheel shaft, the idler shaft, the differential shaft, and the feeler shaft.

Fig. 8 shows a rear elevation of the principal parts shown in Fig. 7, looking obliquely downward.

Fig. 9 is a detail side elevation and partial section of a portion of one of the differential gear sets of the product-transferring mechanism.

Fig. 10 shows an axial section of the parts shown in Fig. 9.

Fig. 11 shows a bottom view of the machine.

Fig. 12 is a detail elevation of a portion of the mechanism by which cams of the machine and the rack bars of the multiplicand keyboard are moved.

Fig. 13 is a fragmentary side elevation and partial vertical section of the lower portion of the machine, showing portions of the mechanism for operating the stepped product disks.

Fig. 14 shows a side elevation of one row of multiplicand keys and associated means for restoring each depressed key upon the depression of another key, one side plate of the guideway having been removed; and Fig. 15 shows a front elevation of one of the multiplicand keys and a transverse section of the roller guideway employed in connection with that key.

Fig. 16 is a detail side elevation and partial section showing one of the stepped product disks, its corresponding rack bar, its corresponding feeler, and the mechanism for transmitting motion from that feeler to the corresponding dial wheel, and for the transfer of tens.

Fig. 17 is a similar view of the same parts in position for the transfer of tens.

Fig. 18 is a detail side elevation of one of the feelers.

Fig. 19 is a detail side view of a portion of the carrying or tens-transfer mechanism, coöperating with each feeler.

Fig. 20 is a rear view of the parts shown in Fig. 19.

Fig. 21 is a side elevation of one of the feelers and the cam mechanism operating in connection therewith.

Fig. 22 is a rear view showing the first and last feelers of the machine (intermediate feelers being omitted for sake of simplicity) together with certain cams and associated parts.

Fig. 23 is a side elevation of the main driving mechanism employed for operating the feelers, cams, rack bars, and other parts of the machine, other than the clearing mechanism.

Fig. 24 is a rear view of the parts shown in Fig. 23, and Fig. 25 is a view similar to Fig. 23, but showing the parts in a different position.

Fig. 26 is a detail end view and partial section of a portion of the mechanism shown in Figs. 23-25.

Fig. 27 is a schematic view illustrating, diagrammatically, the action of the cams on the feelers and associated parts.

Fig. 28 is a detail front elevation and partial section of the carriage with dial wheels thereon and carriage return and dial resetting or clearing mechanism, the casing having been removed.

Fig. 29 is a vertical transverse section of the carriage and associated parts on the line s—s of Fig. 28, and shows carriage feed mechanism.

Fig. 30 is a transverse section of the carriage and associated parts on the line v—v of Fig. 28.

Fig. 31 is a detail elevation and partial section, taken from the left of Fig. 28, and showing a part of the clearing mechanism.

Fig. 32 is a bottom view of a portion of the carriage feed mechanism.

Fig. 33 is a plan view of the parts shown in Fig. 28, with the dial wheels and dial shaft and certain other parts omitted for sake of simplicity.

Fig. 34 is a detail top view of the gate device employed in connection with the gearing mechanism, the differentials of the gearing mechanism being shown in dotted lines.

Fig. 35 shows a side elevation of an alternative mechanism for transmitting motion from the main operating lever to the cams and other mechanism operated by that lever; Fig. 36 shows a fragmentary horizontal section of such alternative mechanism, and Fig. 37 an end view thereof.

Fig. 38 shows a fragmentary vertical section from front to rear through the multiplicand keyboard and associated parts, the upper portion of the carriage being shown in elevation; this view showing means for the restoration of the multiplicand keys by the return of the carriage, means for restoration of the multiplicand keys by the depression of a special restoring key, and means for interlocking the multiplicand keyboard mechanism and multiplier keyboard mechanism to prevent depression of a multiplicand key after the multiplier operation has commenced.

Fig. 39 is a fragmentary transverse section of one of the multiplier keys and associated parts including the interlocking device referred to.

Fig. 40 is a fragmentary section on the plane of Fig. 38, showing one of the multiplier keys depressed and the other keys locked against depression.

Fig. 41 is a fragmentary side elevation of a portion of the restoring mechanism shown in Fig. 38, the carriage being shown in side elevation.

Fig. 42 is a fragmentary vertical transverse section of a portion of the mechanism for the restoration of the multiplicand keys by the action of the carriage.

Figs. 43-47 inclusive indicate means whereby addition as well as multiplication may be performed by the machine; Fig. 43 showing a top view of a portion of the carriage feed mechanism employed in such case, Fig. 44 showing a side view, and partial section of the carriage feed mechanism employed in such case, and associated parts, Figs. 45 and 46 being fragmentary vertical sections, on a plane at right angles to that of Fig. 44, showing the automatic key resetting mechanism in different positions; and Fig. 47 being a fragmentary top view of a portion of the keyboard top plate showing the locking notches for the feed-shift lever.

In my multiplying machine shown in the accompanying drawings there is a multiplicand receiving device, which in the construction shown is a keyboard, and a multiplier receiving device, which in the construction shown is also a keyboard, the two keyboards being arranged side by side; together with a movable carriage, mounted in a manner similar to an ordinary typewriter carriage, except that the carriage moves, during multiplication, from left to right, whereas the carriage of an ordinary typewriter moves from right to left. This carriage carries dial wheels showing products. The multiplicand keyboard comprises a plurality of columns of keys, each comprising in general keys numbered from 0 to 9 inclusive, the number of such columns depending upon the intended capacity of the machine; and there may be a greater or a less number of such columns of keys according to the intended capacity of the machines. The multiplier keyboard comprises, in general, a single column of keys, from 0 to 9 inclusive. Associated with each multiplicand key is a gear wheel, adapted to mesh with a rack beneath and common to all of the keys of that column; each of such gear wheels arranged to be thrown into mesh with its corresponding rack when the corresponding key is depressed; and the gear wheels of the different keys of each multiplicand column are (except as hereinafter stated) of different pitch diameters, corresponding to the numerical values of their respective keys. These gear wheels are inter-connected so that they rotate at the same rotative speed, (except as hereinafter stated), the extent of their rotation being proportional to the numerical value of the particular multiplier key which is depressed. (There is a difference in construction, but not in principle, with respect to the 1 and 2 keys of each column which will be explained later; but for present purposes it may be considered that the gears for the 1 and 2 keys follow the same law as the gears for the higher denomination keys). Each of these rack bars of the multiplicand keyboard is arranged, when operated, to cause rotation of a stepped product disk, the steps of the stepped disk corresponding to the products of the multiplication of different multiplicand digits, by different multiplier digits. Each stepped disk is double, the steps of the lower member of the stepped disk corresponding to the digits of the lower order of the product, the steps of the upper member of the stepped disk corresponding to the digits of the higher order of the product. Associated with each such double stepped disk there are two pivoted feelers, one for each member of the stepped disk, each feeler having a portion adapted to be brought down into engagement with the particular stepped disk step which is brought into registering position with reference to that feeler by the operation of the corresponding multiplicand and multiplier keys; and on each such feeler is a gear segment intermeshing with a gear of a gear train whereby the corresponding dial wheel is rotated. The actuating mechanisms corresponding to the dial wheels of all but the highest or left hand product digit comprise suitable carrying mechanism or tens-transfer mechanism whereby when necessary tens of the product are carried over into the next dial wheel above. It will be seen that any suitable multiplicand within the capacity of the machine may be set up by depressing proper multiplicand keys; and that when a multiplier key is depressed and the gear wheels of the multiplicand keyboard thereafter caused to rotate to an extent dependent upon the numerical value of the multiplier key so depressed, the rack bars corresponding to the multiplicand keys so depressed are each moved to an extent proportional to the product of the numerical value of the corresponding depressed multiplicand key by the numerical value of the particular multiplier key so depressed.

Such movement of the rack bars, proportional to the said products, are transmitted by the rack bars to the stepped disks mentioned, and then the feelers pertaining to such stepped disks are brought down against those steps of such stepped disks presented to such feelers by the particular degree of rotation which has been imparted to each star wheel. The succeeding return motion of the feelers in turn imparts motion, through gear trains, to the dial wheels on the carriage.

A multiplier, naturally, often consists of two or more digits; for example, the multiplier may be 1 2 4. In such case after the multiplicand has been set up, the "4" multiplier key will be depressed and the mechanism of the machine operated; the carriage then steps one step to the right (in practice, this stepping is effected in two half steps; as will be explained later); the "2" key of the multiplier keyboard is then depressed and the mechanism of the machine operated; the carriage then steps a further step to the right; the "1" key of the multiplier keyboard is then depressed, and the mechanism of the machine operated; whereupon the product of the multiplication will appear on the dial wheels carried by the carriage. By such stepping of the carriage to the right, compensation is made for the particular column to which the digit of the multiplier belongs. Means are provided, as hereinafter described, for clearing the machine after each final product has been obtained, preparatory to the use of the machine for a further multiplication.

Referring now to the drawings: A designates the multiplicand keyboard comprising, in the machine shown, seven columns of keys from front to rear numbered from 0 to 9 inclusive; and B designates the multiplier keyboard comprising, in the machine shown, one column of keys numbered from 0 to 9 inclusive. C designates the carriage carrying the dial wheels D; the carriage being mounted to move laterally in suitable ways E (Figs. 29 and 30), the mounting of the carriage being similar to that of a typewriter carriage, and the particular details of this mounting being unimportant.

*Multiplicand keyboard.*

Numeral 1, (Figs. 1, 2, 3 and 6) designates one of the keys of the multiplicand keyboard (the fourth or "3" key of one of the columns). The particular key to which this numeral is applied is immaterial, and the operation of the other keys of the multiplicand keyboard and associated parts is entirely similar in principle, and is exactly similar in effect, (except in a minor respect relating to the "1" and "2" keys, as hereinafter explained). Beneath each row from front to rear of keys of the multiplicand keyboard there is a rack bar 2 mounted to slide from front to rear and intermeshing with a pinion 3 on a transverse shaft 4; each such pinion 3 being secured to a corresponding two-part stepped product disk 5—5ª (in practice each such pinion 3 is located between the two parts 5 and 5ª of its corresponding stepped product disk, as indicated particularly in Fig. 11). Below, and normally out of mesh with the rack bar 2, are gears 6 and 6ª, one for each key corresponding to that rack bar; such gears being axially movable into and out of mesh with the corresponding rack bar and, in normal positions, being alternately to the right and to the left of the corresponding rack bar. Each key is provided with a lever mechanism 7—8 for throwing the corresponding gear 6 or 6ª into and out of mesh with the corresponding rack bar 2; each such lever 8 being pivoted at 9 to a stationary portion of the frame of the machine, and the pivotal connection of each lever 7 to the corresponding key 1 being above its point of pivotal connection to the corresponding lever 8 when that key is in elevated position, and being preferably somewhat below such point of pivotal connection to lever 8 when that key is in depressed position; so that, each lever 9 having a coil spring 10 as shown particularly in Fig. 6, the reaction of the spring tends to hold such key 1 in either its elevated or depressed position, according as the key has been left in its elevated or depressed position. In Fig. 6 I have shown one key, 1, in depressed position, and behind it another key, 1ª, in normal or elevated position; the gear 6 of key 1 being in mesh with rack bar 2, and the gear 6ª of key 1ª being out of mesh with rack 2. As shown particularly in Figs. 6, 14 and 15, each key 1 works, at its lower end, in a guide-way 11, wherein are guide rollers 12—12 and restoring rollers 13; the lower end of each key, 1, being pointed as shown, for engagement with the periphery of one of the rollers 13. When one of the keys 1 has been depressed, it moves to one side the rollers 13, and thereby cams upward, or restores, that key, if any, which was previously depressed. This constitutes what is termed a "flexible keyboard" mechanism which is simpler than any other flexible keyboard mechanism of which I am aware; and which constitutes one feature of my invention.

*Multiplier keyboard and mechanism transmitting motion to stepped star or product wheels.*

Referring now for the moment to the multiplier keyboard, (Figs. 5-5ᵉ inclusive): Numeral 14 designates one of the multiplier keys (it is immaterial to which key reference is made, the particular key to which that numeral is applied in Fig. 5 being the "6" key). These keys 14 are mounted to move vertically (and also to have a slight oscillating motion) and are suitably guided by slots in guide frames 15 and 16; and springs 17 tend to hold these keys 14 elevated. Associated with keys 14 there is a longitudinally movable bar 18 mounted upon pivoted links 19 and 20; and this bar is provided with studs 21 and 22, for each key, the stud 21 adapted to coact with the projection 23 of the key bar, and the stud 22 adapted to coact with recesses 24 and 25 of the key. When one of the keys 14 is depressed, the cam projection 23 of such key, engaging the stud 21 of the bar 18, moves that bar to the right (as the parts are viewed in Fig. 5) thereby raising a locking lever 26 partly out of the path of an operating rack bar 27; Fig. 5ª shows the locking lever 26 in such position. This movement of the bar 18 brings the studs 22 of the bar 18 into engagement with the recesses 24 of all the keys, except that key which has been depressed, and except the zero key 14ª, the stud 22ª for which is more distant from its key than are the studs 22 for the other keys. The reason for this will be explained later. Engagement of the studs 22 with the keys 14 other than that key which has been depressed, locks such other keys 14, preventing the simultaneous depression of two keys 14. The stud 22 corresponding to that key 14 which has been depressed enters the notch 25 of that key, such notch 25 being provided merely to permit movement of the bar 18.

A gear 28 intermeshes continuously with rack bar 27. This gear 28 is rotated, after the depression of one of the keys 14, by operation of a hand lever 31 (Figs. 1, 2, 2ª and 23) and intermediate mechanism hereinafter described. Such rotation of the gear 28, under the influence of the hand lever and connections to be referred to hereinafter, rotates that gear in the direction of the arrow shown in Fig. 5; and moves the rack bar 27 to the right (as the parts are viewed in Fig. 5) until that rack bar is arrested by engagement of a stud 29 on such rack bar with the key 14 which has been depressed. The rack bar 27 in so moving, engages the beveled lower portion 26ª of lever 26, thereby raising such lever and, in so doing, moving bar 18 to the right far enough to bring the stud 22ª corresponding to the "0" key 14ª into engagement with the recess 24 of that key.

The rotation of gear 28 (Fig. 5) is caused by rotation of the shaft 30 on which that gear 28 is mounted. The hand lever 31, before referred to as the means by which shaft 30 is caused to rotate, is shown in Figs. 1, 2, 2ª, 23 and 24. This hand lever operates, through intermediate mechanism to be described hereinafter, a lever 31ª (Fig. 13) connected by a push rod 32 to a gear sector 33 which intermeshes with a gear 34 on the "1" shaft 35 of the multiplicand keyboard and with a gear 36 of the "2" shaft 37 of the multiplicand keyboard, and with a gear 38 (Fig. 11) on the "3" shaft 39 of the multiplicand keyboard. The "4,"

"5," "6," etc., shafts 40, 40ᵃ, 40ᵇ, etc., of the multiplicand keyboard, are driven from gear sector 33 and gear 39ᵃ on shaft 39, through a rack bar 41 and suitable pinions 42, 42ᵃ, 42ᵇ, etc. Therefore, the shaft 39 and the shafts 40, 40ᵃ, 40ᵇ, etc., all rotate at the same rotative speed. The final pinion 42ᵉ, of the series of pinions or gears intermeshing with rack bar 41, is on the shaft 30 above mentioned, so that this shaft 30 (which might also be termed shaft 40ᵉ) rotates at the same speed as the shafts 40, 40ᵃ, 40ᵇ, etc. When any one of the keys 1–9 inclusive of any one or more of the columns of the multiplicand keyboard is depressed, therefore, and its corresponding gear 6, or 6ᵃ, is brought into mesh with the corresponding rack bar 2 of the multiplicand keyboard, and when one of the multiplier keys 14 (Fig. 5) has been depressed, and then the lever 31 is operated, so moving the gear sector 33 (Fig. 13) and thereby moving the various shafts 39, 40, 40ᵃ, 40ᵇ, etc., and 30, and thereby causing these shafts to rotate until such rotation is stopped by engagement of the stud 29 of rack bar 27 with that multiplier key which has been depressed, it will be clear that the rack bar or bars 2 of the multiplicand keyboard corresponding to the key or keys of the multiplicand keyboard which have been depressed, will each be moved a distance corresponding to the product of the numerical value of each such multiplicand key which has been depressed, by the numerical value of the multiplier key which has been depressed; for, the motion of the rack bar 27 of the multiplier keyboard is clearly proportional in distance to the numerical value of that multiplier key which has been depressed; and, as has been stated previously, the depression of any key of the multiplicand keyboard throws into mesh with the corresponding rack bar 2 a gear 6, or 6ᵃ, of a pitch diameter proportional to the numerical value of that multiplicand key depressed, (and as has been shown previously, these gears 6 and 6ᵃ all rotate at the same rotative speed, with the exception of the gears on the shafts corresponding to the "1" and "2" shafts of the multiplicand keyboard, to which reference will be made presently).

Since, as just shown, upon the depression of a key of one or more of the columns of the multiplicand keyboard, and the depression of a key of the multiplier keyboard, and the operation of the lever 31, the rack bars 2 corresponding to the several multiplicand keys depressed, are each moved a distance proportional to the product of the numercial value of the corresponding multiplicand key depressed multiplied by the numerical value of the multiplier key depressed, each rack bar 2 causes rotation of its corresponding double stepped product disk 5—5ᵃ a corresponding distance. It will be evident that if now the feelers 43 and 43ᵃ corresponding to each such double stepped product disk 5 and 5ᵃ (see for example, Figs. 3 and 4, and 16–18, inclusive) be drawn down upon steps of such stepped product disks corresponding to the numerical value of the product of the digit of the corresponding multiplicand key depressed by the digit of the corresponding multiplier key depressed, motion corresponding in amplitude to such product may be transmitted by the gear segments of such feelers, through intervening gearing, to the appropriate dial wheels of the carriage.

Since some products of multiplication of one digit by another may be represented by a single digit (for example 3×3) while other products of one digit by another are represented by two digits (81 being the highest product of any one digit by another digit) I have found it convenient to employ, in connection with each rack bar 2 two stepped product disks, viz:—5 and 5ᵃ. The first lobe 44 of each disk 5 carries steps of a value corresponding to 0 to 9 inclusive (i. e., the products of the multiplication of digits 0 to 9 inclusive by digit 1); the next lobe 45 of each product disk 5 carries steps corresponding in numerical value to the lower order digit of two digit products of which the higher digit is 1; while a corresponding lobe of the associated product disk 5ᵃ is provided with a step corresponding in numerical value to 1; the third lobe of product disk 5 carries steps corresponding in numerical value to the lower order digit of two-digit products of which the higher digit is 2, while a corresponding lobe of the associated product disk 5ᵃ is provided with a step corresponding in numerical value to 2; and so on. Of course, it is unnecessary to provide the stepped product disks 5 and 5ᵃ with steps corresponding to prime numbers (i. e. numbers which are not divisible). By employing two associated product disks, 5 and 5ᵃ, corresponding to each rack bar 2, i. e., corresponding to each column of the multiplicand keyboard, and by employing corresponding feelers 43 and 43ᵃ, and suitable carrying mechanism, as hereinafter described, I am able to transmit to the dial wheels of the carriage the product of the multiplication of the numerical value of any multiplicand key or keys depressed, by the numerial value of any multiplier key depressed.

The hand lever 31 previously referred to in connection with the operation of the rack bars of the multiplicand and multiplier keyboards, is connected by a link 67 with mechanism hereinafter described, whereby, with each complete stroke of the lever 31, a complete rotation is imparted to a gear 68 (Fig. 23). The mechanism by which motion is communicated from lever 31 to gear 68, includes means, hereinafter described, whereby a complete rotation of the gear 68, without overthrow, is assured for each operation of lever 31. This gear 68 is on, and drives, a transverse cam shaft 69.

*Transfer mechanism, dial wheels and carriage.*

Referring to Figs. 3, 4 and 7–10 inclusive. As shown particularly in Fig. 7, the gear segments of the feelers 43 and 43ª mesh respectively with pinions 46 and 46ª which are loose on a shaft 47; except that the first gear of the series, 46ˣ, is fixed upon the shaft 47, and there is no feeler for this first gear 46ˣ. Each gear 46, or 46ª, drives another gear, 48, (there being one gear 48 for each pair of gears 46 and 46ª) through a planetary gear, 49 or 50 (Figs. 9 and 10) the gear 49 being in mesh with the gear 46ª on the left hand side (as viewed from the rear) of corresponding gear 48, and the gear 50 being in mesh with the gear 46 on the right hand side of the corresponding gear 48, (gears 49 and 50 being in mesh with each other). Gears 49 and 50 are mounted in bearings on brackets 51 carried by gear 48. It will be clear, since gears 49 and 50 are planetary gears, that rotation of either a gear 46ª, or of a gear 46, associated with any particular gear 48, will cause corresponding rotation of that gear 48, through the planetary gear 49, or 50, as the case may be; and it will also be clear that both gears 46 and 46ª, associated with any particular gear 48, can be operated simultaneously, with summation effect on the corresponding gear 48. Thus, supposing a gear 46ª associated with a particular gear 48 to remain stationary while the gear 46 on the opposite side of such gear 48 is rotated, rotation of such gear 46 will drive planetary pinion 50, and so will drive gear 48, planetary pinion 49 rolling idly about gear 46ª; and similarly if gear 46ª be rotated while the corresponding gear 46 is held stationary, pinion 49 will be driven and will drive gear 48 while planetary pinion 50 will rotate idly about gear 46; while if both gears 46 and 46ª associated with any particular gear 48 be rotated, then both planetary pinions 49 and 50 are driven, and gear 48 is given a movement which is the sum of the movements given to it by planetary pinions 49 and 50. I use the term "differential gear set" to designate the gear sets each comprising a gear 48, driven by gears 46 and 46ª through planetary gears 49 and 50. There is one such differential gear set for, and arranged to drive, each dial wheel of the carriage.

Of the two feelers, 43 and 43ª, associated with any particular rack bar 2, feeler 43 actuates the gear 46 of the planetary set which drives the dial wheel corresponding to that rack bar, while feeler 43ª actuates the gear 46ª of the planetary set next above or to the right (as viewed from the rear of the machine, in Fig. 7) i. e., of the next higher order or "place"; in this way any motion of a feeler 43ª has, with respect to the result as indicated on the dial wheels, ten times the effect of a corresponding movement of the associated feeler 43.

The final gear 48 of each differential gear set intermeshes with an intermediate gear 52 (see particularly Figs. 29 and 30) on a shaft 53 carried by the carriage C; and each gear 52 intermeshes with a dial-wheel gear 54 mounted upon a shaft 55 also carried by the carriage, and fixedly connected to a corresponding dial wheel 56 also mounted upon shaft 55. These dial wheels carry numerals 0–9 inclusive; and in the particular arrangement shown, each dial wheel carries two successive series of numerals 0–9 inclusive.

The operation of transferring the motion of the rack bars 2 and corresponding stepped product disks 5 and 5ª to the dial wheels of the carriage is, in part, as follows:

Supposing one or more of the double stepped product disks 5 and 5ª to have been rotated by the corresponding rack bar or bars 2, to a position or positions representing some partial product, then at a proper point in the rotation of shaft 69, (such rotation being caused, as hereinafter described, by operation of hand lever 31) the cams 156 and 157 (Fig. 21) for actuating the feelers 43—43ª cause a frame 151—152—159 hereinafter mentioned (see Fig. 22) to move down, thereby moving down member 151 of such frame, (which as shown in Fig. 16, normally engages shoulders 150 of all of the feelers,) and so permitting the springs 158 of the several feelers to draw those feelers down each into engagement with that portion of its corresponding product disk which is presented to it; and, in general, some of the feelers will move farther than others. During this motion of the several feelers, though their gear sectors are in engagement with the gears 46 or 46ª of the differential gear sets, no motion of the dial wheels is caused, because, as explained hereafter, at such time the gears 48 are out of mesh with the intermediate gears 52. At another suitable point in the rotation of the shaft 69, the cams 156—157 move the frame 151—152—159 back to normal position and so cause member 151 of that frame to move these feelers backward to normal position and the gear sectors of the feelers in such reverse motion communicate motion to the corresponding gears 46 or 46ª as the case may be, of the corresponding differential gear sets; and the resulting motion of the gears 48 of the differential gear sets, is communicated through gears 52 to the dial wheels of the carriage, since at this time, as will be explained hereafter, the gears 48 and 52 are in mesh.

In the course of rotations thus communicated to the dial wheels, occasion will arise, of course, for "carrying", i. e., transfer of tens, from one dial wheel to the next.

For carrying or transfer of tens from one dial wheel to the next, I employ the following mechanism: Each dial wheel except that corresponding to the highest order of digits, is provided with two laterally projecting pins 57 and 58, (Figs. 28 and 30) on opposite sides of such dial wheel, pin 57 corresponding to one of the series of digits on that dial wheel, pin 58 corresponding to the other series of digits on that dial wheel. At one point in the revolution of a dial wheel, its corresponding pin 57 encounters one arm 59 of a trip, 59—60, and raises that arm, the other arm 60 of such trip then actuating a pusher 61 (Fig. 19) pivoted to one arm 62 of a pivoted catch 63, thereby raising a claw 64 on the other arm of such catch 63 into engagement with a pin 65 on a short spring-actuated lever 66 itself pivoted to the corresponding feeler 43 or 43ª. (At a diametrically opposite point in the rotation of such dial wheel the pin 58 actuates another similar trip and pusher 61. The mechanisms which the pins 57 and 58 operate are separate, as far as the lever 71 hereinafter mentioned, but similar; hence it is necessary to describe only one of such mechanisms). The pushers 61 are offset, as shown in Fig. 8, so that each pusher actuates means, now to be described, corresponding to the feeler 43 or 43ª next above or of the next higher order or "place".

There is a catch 63 for each feeler 43 or 43ª, one catch arranged to be operated as described by a pin 57 and its pusher 61, the other arranged to be operated as described by a pin 58 and its pusher 61, each pair of such catches 63 being mounted upon the same lever 71 actuated by a cam 70 of which there is one for each such lever 71. The shaft 69 is rotated by operation of the hand lever 31 (Figs. 1, 2, 2ª, 23 and 24), as already stated. The rises or actuating portions of these cams 70 do not all occupy the same angular position, but are retarded relatively, from left to right of the machine, as viewed from the rear (see Fig. 27), so that the carrying from one dial wheel to the next will be conducted successively from left to right of the machine (as viewed from the rear), during the operation of the hand lever 31. Each cam 70, at the proper point in the rotation of the shaft 69, oscillates the corresponding spring actuated lever 71 carrying the two catches 63 before mentioned; and if, during the rotation of the dial wheels, any one of such catches 63 has been actuated by a dial wheel pin 57 or 58, then when the lever 71 of that catch 63 moves rearwardly, the claw 64 of that catch will engage the pin 65 of the corresponding feeler 43 or 43ª, so carrying that feeler 43 backward through a distance sufficient to rotate the corresponding dial wheel through one space; thereby effecting the "carrying" or transfer of tens from one dial wheel to a dial wheel next above. (It should be explained that this carrying movement of the feelers 43 is backward from the normal or rest position of the feelers, whereas the movement of the feelers toward and from the corresponding product disks is forward of the normal or rest position. This rest position of the feelers is shown in Figs. 3 and 4; the feelers being just clear of the product disks. When one of the product disks is rotated from the normal or rest position shown in those figures, and then its feeler is brought down to engage the proper step of that product disk, such feeler moves forward or to the left from the rest position shown in Fig. 3, and then is returned, as already described, to the rest position. Carrying occurs, if at all, after the feelers have been returned to such rest position, and in such carrying operation the feelers move backward or to the right of Figs. 3 and 4 from the rest position shown in those figures. This follows naturally from the fact that when the feelers move forward from the rest position shown in Figs. 3 and 4, into engagement with proper steps of their corresponding product disks, though they then cause rotation of the differential gears 48, such rotation is not transmitted to the dial wheels, the idler gear wheels 52 of the carriage being then out of mesh with their corresponding differential gears 48, as hereinafter described; when the feelers 43 move back from engagement with the steps of product disks to the normal or rest position shown in Figs. 3 and 4; the idler gears 52 are in mesh with the differential gears 48, so that rotation of the differential gears 48 caused by such backward motion of the feelers to normal position, is communicated through the idler gears 52 to the dial wheels 56, and naturally it is this motion of the dial wheel which gives occasion for carrying. In such motion of the dial wheels, if occasion for carrying arises, one or both of the studs 57 or 58, of such dial wheels, actuate the trips 59—60, and actuate the push rods 61, thereby engaging the corresponding claws 64 with the pins 65 of the feelers 43; and then the cams 70 actuate the lever 71, causing the feelers 43 to move backward from their normal or rest positions a distance sufficient to effect the carrying. As already stated the push rods 61 are offset, as shown particularly in Fig. 8, so that each push rod 61, when actuated as described, actuates a feeler 43 of a differential gear set corresponding to the dial wheel next above that dial wheel having the pin, 57 or 58, which caused the actuation of such push rod.) It will be observed that the actual work of carrying, like the actual work of transferring partial products to the indicating dials, is done by cam mechanism actuated by the main operating lever 31, the dial wheels merely setting catches, when carrying is to be performed, which catches cause the carrying operation to be performed directly by the same mechanism. This greatly simplifies much of the mechanism of the machine, and lightens the action.

By employing two separate carrying devices for each dial wheel, I am able to transfer ten twice from such dial wheel to the dial wheel next above, during any one operation of hand lever 31. Consideration will show that there is never occasion for transferring ten more than twice from any one dial wheel during any single multiplication.

Each lever 71 is provided with two pivoted spring actuated lock members 72, one for each catch 63. One or the other of these members 72 locks the corresponding catch 63 of that lever 71 in engagement with or in the path of the corresponding feeler pin 65 to cause backward movement of said feeler 43 from rest position for "carrying"; and when the rises of the corresponding cams 70 pass beyond the levers 71, those levers, being spring retracted, at first pass below, and then are restored to, normal position, and in such motion a trip bar 73 engages such locking member or members 72 as may then be in locking position, and disengages such locking members 72 from the corresponding members 63, so disengaging their claws 64 from the pins 65, thus restoring member 63 so that they are in position to operate when required in subsequent operations.

It will be obvious that in operating the machine, after the multiplicand has been set up by depression of proper keys of the multiplicand keyboard, multiplication is effected by depressing proper multiplier keys one by one, beginning from the right of the multiplier; that is to say, suppose that the multiplier be 769; the multiplicand having been set up, the operator will first depress the "9" multiplier key, and operate the lever 31; he will then depress the "6" multiplier key and again operate the lever 31; and he will then depress the "7" multiplier key and again operate the lever 31. In order that each multiplier key, when depressed, and the lever 31 actuated, may have an effect upon the dial wheels, corresponding to the order or "place" of the corresponding digit (i. e., corresponding to whether such digit is in the units column, or in the tens column, or in the hundreds column, etc.), after multiplication by a digit in the units column the carriage carrying the dial wheels is caused to move one space to the right (as viewed from the front of the machine); and after multiplication by a digit in the tens column the carriage again moves one space to the right; and so on. These movements are, in practice, effected in two half steps of the carriage. Normally, i. e., when the machine is at rest, the intermediate gears 52 are out of mesh with the differential gears 48. When the multiplicand has been set up, and a multiplier key is depressed, and then the lever 31 operated, the carriage is caused to move one half step to the right (as viewed from the front of the machine) after the feelers 43 have come down to the steps of the corresponding product disks, and while those feelers are still in engagement with such steps. This brings the intermediate gears 52 into mesh with the differential gears 48. When the feelers move back to their normal or rest position, rotation of the differential gears 48 is caused, as previously explained, and thereby the dial wheels are rotated and carrying effected, as previously explained. After the carrying operation, the carriage moves a further half step to the right, (as viewed from the front of the machine) thereby moving the intermediate gears 52 out of engagement with the differential gears 48. Upon depression of the next key of the multiplier keyboard, and actuation of the lever 31, the carriage moves a further half step to the right, after the feelers have come down, and then moves a further half step to the right after the feelers have returned to normal position and after carrying has been effected; and so on.

It will be apparent, that, due to the alternation of the meshing and disengaging of the carriage gears with the differentials, the motion of the differentials incident to downward or forward movement of the feelers is not transmitted to the dials, but during the return movement of feelers the motion of the differentials is carried into the dials.

The means by which these motions of the carriage is effected are as follows: The carriage is provided with the usual feed rack 74 (Figs. 29 and 33) with which rack a gear 75 engages. This gear is on a shaft 76, which shaft carries a ratchet wheel, 77, with which wheel two spring actuated pawls 78 and 79 engage (Fig. 32). These pawls are carried by a cam-actuated member 80, the cams 81 and 82 for which are mounted on the cam shaft 69. One of these cams, 82, acts to push member 80 forward, or to the left of Fig. 29, the other, 81, to push the member 80 back, or to the right of Fig. 29. The cams 81 and 82 are properly positioned, of course, on shaft 69, to cause feeding of the carriage by half steps at proper times, as previously stated. The member 80 is provided with anti-friction rollers 83 and 84 arranged to be engaged by cams 81 and 82 respectively. After the feelers have come down into engagement with their corresponding stepped product disks, as previously explained, cam 82 moves member 80 to the left of Figs. 29 and 32, causing rotation of the ratchet wheel 77 through the space of one tooth, and so causing the carriage to feed one half space; pawl 78 being moved back into engagement with another tooth of the escapement wheel 77; and after the feelers have returned to normal position, and after carrying has been effected, the cam 81 moves the member 80 backward or to the right of Figs. 29 and 32, causing the pawl 78 to move ratchet wheel 77 through the space of another tooth, and so causing the carriage to move a further half step to the right. The member 80 is provided with two pins 85 and 86 which coact with a toothed position wheel 87 on the shaft 76, to cause the ratchet wheel 77, and therefore the carriage C, to come to rest in exact positions.

*Clearing.*

After completion of a multiplication, it is of course necessary to "clear" the machine, *i. e.*, to return the carriage to its extreme left hand position, and also to restore the dial wheels to zero position preparatory to a further multiplication operation.

It will be remembered that at the conclusion of each multiplication operation the intermediate gears 52 (Figs. 7, 8 and 29) are left out of mesh with their corresponding differential gears 48. Therefore, for clearing, the dial wheels, and with them the intermediate gears 52, may be rotated without causing corresponding rotation of the differential gears 48 causing corresponding movement of the feelers 43. Thereby the clearing operation is greatly simplified.

Upon the carriage C is a hand lever 88 (Figs. 28, 29 and 33). Clearing involves, not only return of the various dial wheels 56 to zero, but also involves return of the carriage to its extreme left hand position (as the machine is viewed from the front). To effect clearing and such return of the carriage, the hand lever 88 is pushed toward the left (as viewed in Fig. 33). This hand lever carries as a rigid part of it, a cam 89 (Figs. 29 and 33) adapted to actuate a lift 90 connected to the carriage feed rack bar 74, which rack bar is pivoted to the carriage. The first effect of movement of lever 88 to the left is, therefore, to raise the rack bar 74 out of mesh with the feed gear 75; thereby freeing the carriage for movement to the left.

The hand lever 88 also carries a gear sector 91; and a pin 88ª on lever 88 picks up sector 91 after lever 88 has moved so far that the cam 89 causes the lift of rack bar 74. Sector 91 intermeshes with a vertical pinion 92 intermeshing with a rack bar 93 mounted to slide in a tubular guide 94 (Fig. 29). (This rack bar is cylindrical and might possibly, for that reason, be taken for a worm; however, it is not a worm, since its teeth have no pitch whatever; *i. e.*, are not helical, but are collars; the rack is constructed as a cylinder, simply for cheapness in construction and ease of guiding). The rack bar 93 intermeshes with a pinion 95 keyed to dial wheel shaft 55 by a pin 96 (Fig. 28). While motion of the lever 88 toward the left tends to cause pinion 95 and shaft 55 to rotate, such rotation is at first prevented by engagement of a dog 97 on shaft 55 with a pawl 98 (Fig. 28). Therefore, until dog 97 is disengaged from pawl 98, as hereinafter described, movement of the lever 88 to the left cannot cause rotation of shaft 55 and dial wheels 56, but instead the carriage moves bodily to the left until arrested. For such arrest of the carriage, the frame of the machine is provided with a lug 99 (Fig. 28) which, near the end of the leftward motion of the carriage, is engaged by a lug 100 carried by a member 101 (Figs. 30 and 31) slidably movable through a small range between guide plates 102. When lug 100 first encounters lug 99, the leftward motion of the carriage proper is not stopped, but member 101 is moved slightly to the right with reference to the carriage. This member 101 has a lug 103 (Fig. 28) engaging a collar 104 keyed to shaft 55, and of which collar the dog 97 before mentioned is a part. After first engagement between lugs 99 and 100, therefore, the effect of further movement of the carriage to the left is to cause the dog 97 to move laterally to the right (with reference to the carriage) out of engagement with the pawl 98. This movement of the collar 104 to the right does not cause corresponding movement to the right of the various dial wheels 56, for the last or left hand dial wheel is held against such movement by a fork 105 (Fig. 28). A somewhat similar bracket 105ª at the right of the right-hand dial together with interposed collars 105ᵇ between the various dials and gears serves to maintain the lateral positions of the dials. These interposed collars are slotted on the upper side to permit entrance and longitudinal motion of the pins or arms 107.

Lug 100 works within a slot 106 in the frame of the carriage, and when such lug 100 reaches the right hand extremity of such slot 106, the carriage is brought to rest. By this time dog 97 is out of engagement with pawl 98. Further movement of the lever 88 to the left, therefore, causes motion of gear sector 91 (Fig. 33) around its axis, communicating rotation to pinion 92, and so to rack 93, and thence to pinion 95 on shaft 55. This shaft 55 carries radial arms 107, one for each dial wheel. Each dial wheel has two laterally projecting pins 108. The movement of shaft 55, to disengage dog 97 from pawl 98, brings these pins 107 into the path of pins 108. During the rotation of shaft 55 just referred to, each pin 107 will, at some point in the rotation of shaft 55, pick up one or the other of the pins 108 of the corresponding dial wheel, and will rotate such dial wheel to zero position (of course, if it happens that any particular dial wheel is at zero at the beginning of the restoring operation, the pin 107 corresponding to that dial wheel will not engage one of the pins 108 of that dial wheel, until the shaft 55 is in zero position; so that in such case no rotation of that particular dial wheel will occur).

Projecting to the right from a fixed portion of the carriage is a stop 109 with which the dog 97 engages when, by rotation of shaft 55, the dial wheels have been brought to normal or zero position; such engagement arrests further rotation of shaft 55 and therefore arrests further motion of hand lever 88 to the left. Upon release of this hand lever it is restored to normal position by a spring 110, which spring acts through pinion 95, rack 93, pinion 92 and gear sector 91 upon lever 88; so that return of this lever 88 to normal position also involves return of the other parts mentioned to normal position. The spring 110, besides acting as a torsion spring also acts as a compression spring to restore shaft 55 to the left; for, during motion of shaft 55 to the right, the pinion 95 acts as a collar to compress this spring 110. The stop 109 also acts as a stop to bring shaft 55 and pins 107 back to correct radial position; the dog 97 having a beveled left hand face, as shown, which permits it to pass the pawl 98 during this backward rotation of shaft 55.

Upon restoration of the lever 88, as described, the carriage rack bar 74 of course drops into engagement with the feed gear 75.

To insure that the dial wheels, when restored to first position shall not overthrow beyond zero position, hooks 111 are provided for the several dial wheels, these hooks being attached to and moving with the slide member 101 (see Fig. 30); which hooks, when the shaft 55 is in its rightward position with respect to the dial wheels, will engage one or the other of the pins 108 of that dial wheel when the pin is in zero position.

A spring actuated detent 112 is provided for each dial wheel and engages the teeth of the corresponding gear 54 of that dial wheel; and such detents, since they prevent the dial wheels from rotating except when positively actuated, prevent the dial wheels from creeping backward by friction from zero position when the shaft 55 flies back. As soon as the shaft 55 moves to the left again, under the influence of the spring 110, the hooks 111 are moved out of the paths of the pins 108.

The clearing of the machine is thereby completed and the machine is in readiness for a further multiplication operation.

*Details, description of which has been omitted heretofore.*

Each row of keys of the multiplicand keyboard is provided, as already stated, with a zero key designated in Figs. 1, 1$^b$, 3 and 14 by numeral 1$^x$. These zero keys do not actuate any gears 6 or 6$^a$, but are provided with a beveled lower end, like the keys 1, to actuate the rollers 13 by which the restoration of the keys 1 is effected. These zero keys 1$^x$ are not absolutely required, but are convenient for the correction of any mistake made in the setting up of the multiplicand, since, if a wrong key is depressed in setting up the multiplicand, that key may be restored by depression of the corresponding zero key. A key depressed through error can be restored by simply depressing the correct key before pulling the hand lever; but the zero key is more convenient for making the correction. It is also considered better to provide the zero key, because, though the zero keys do not affect the multiplication mechanism it is easier for the operator to depress an appropriate zero key, when a zero occurs in the multiplicand, than it is for the operator to remember to depress no key whatever when a zero occurs in the multiplicand; and by providing these zero keys, the chances of an error are reduced, because, if no operation were provided to correspond to the occurrence of a zero in the multiplicand, the operator would be very liable to depress the key corresponding to the next numeral of the multiplicand in the wrong column. The presence of the zero keys in the multiplicand keyboard also facilitates the reading of the multiplicand after it has been set up. As shown in Fig. 1$^b$ the zero keys, like the other multiplicand keys, are provided with the lever mechanism 7—8—10—so that such zero keys are held in either the rest or normal position, or in the depressed position, until positively moved from such position.

In the multiplier keyboard, a zero key 14$^a$ is also provided, as previously stated. All of the keys of the multiplier keyboard are provided with springs 17 tending to restore them; but restoration of any multiplier key depressed is prevented, normally, by engagement of the plate 16 with a notch 113 in the multiplier key. It should be explained that these multiplier keys 14 besides having a motion upward and downward, have a slight oscillating motion. The zero key 14$^a$ has not this oscillation. When each key 14 is depressed, as it nears the end of its downward movement it is oscillated slightly toward the front of the machine owing to the oblique pull of its spring 17; thereby engaging the notch 113 of such key with the plate 16. Disengagement of such depressed key, so locked, is affected either by the depression of the zero key 14ª, or by the action of rack bar 27 on such depressed key; for when, during the multiplying operation, the rack bar 27 is moved toward the back of the machine, and the pin 29 of that rack bar engages the depressed key 14, not only is the rack bar brought to rest, but the depressed key is tilted back, against the oblique pull of its spring 17, enough to disengage the notch 113 of the depressed key from the plate 16, such depressed key being nevertheless prevented from rising more than a very slight amount at that instant, owing to engagement of such pin 29 of the rack bar with the notch 114 of the depressed key; the slight rise of the depressed key at this instant, however, sufficing to raise the shoulder 113 of the depressed key past the lower edge of the plate 16. When, after the completion of the multiplication operation, the gear 28 is rotated backward (as hereinafter explained) and thereby the rack bar 27 is restored to normal position, the pin 29 of the rack bar moves out of such notch 114 permitting the spring 17 of that depressed key to restore the key.

Just above the plate 16 above mentioned, is a sliding plate 115 having slots in it through which the several keys 14 pass; and this plate 115 is provided with a hook 116 for each of said keys, except the zero key 14ª. When one of the keys 14 is depressed, and then oscillated slightly, owing to the angular pull of its spring 17, as previously explained, the plate 115 is moved slightly to the front of its normal position, as indicated in Fig. 5ª; this is due to the engagement of the hook 116 of that plate by the forward edge of the depressed key. When the zero key 14ª is depressed, its cam projection 117 engages an upturned beveled end 118 of plate 115, thereby moving plate 115 back, and because of the engagement of one of the hooks 116 of that plate 115 with the depressed key 14, oscillating that depressed key 14 so that its shoulder 113 (which has previously engaged the plate 16,—the depressed key to the right in Fig. 5ª is shown in such engagement with plate 16) disengages that plate 16; the spring 17 of that depressed key being thereby enabled to draw up the depressed key 14. There is nothing to prevent the rise of the zero key 14ª immediately pressure thereon is relieved, for, as above explained, the pin 22ª of bar 13 does not engage the corresponding notch of the zero key 14ª until the operating lever 31 of the machine has been actuated and so has moved the rack bar 27 far enough to raise the pivoted latch 26 from the position shown in Fig. 5ª.

The pivoted latch 26 is provided with a notch 119, adapted to engage the lug 120 at the front end of the rack bar 27, and prevent motion of that rack bar, and so to lock the machine, in case attempt should be made to operate the lever 31 without depressing any multiplier key. The first effect of the depression of a multiplier key, is, as previously explained, to lift the latch 26 to the position shown in Fig. 5ª in which position the notch 119 of the latch is no longer opposite the lug 120 of the rack bar 27.

Referring to Figs. 4, 11, and 13. In order that the larger of the gears 6 and 6ª which actuate the rack bar 2 need not be too large for convenience in design, and in order, on the other hand, that the gears corresponding to the 1 and 2 shafts, of the multiplicand keyboard, need not be smaller than desirable, there is a slight difference between the drive of the 1 and 2 shafts and the drive of the 3—9 shafts. As previously explained, the gear sector 33 intermeshes directly with the gear 38 on the 3 shaft; and the 3—9 shafts are connected through the equal gears 39ª, 42, 42ª, 42ᵇ, etc., to rotate at the same rotative speed, by a sliding rack bar 41. The 2 shaft is driven, not from the rack bar 41, but from a gear 36 on the 2 shaft of one and one half times the pitch diameter of gear 38 on the 3 shaft, while the gears 6ª on the 2 shaft 37 which intermesh with the rack bars 2 are of the same pitch diameter as the gears 6 on the 3 shaft 39; and similarly, the 1 shaft 35 is driven direct from gear sector 33 by a gear 34 of three times the pitch diameter of the gear 38 on the 3 shaft 39, the gears 6 on the 1 shaft 35 which drive the rack bars 2, being of the same pitch diameter as the gears 6 on the 3 shaft 39 which drive the rack bars 2. Therefore, although the gears 6 and 6ª of the 1 shaft 35, the 2 shaft 37, and the 3 shaft 39 are all of the same pitch diameter, yet since the 2 shaft 37 is rotated at two-thirds the speed of the 3 shaft 39, and the 1 shaft 35 is rotated at one third of the speed of the 3 shaft 39, the 1 keys, 2 keys and 3 keys, when depressed, each give to their rack bars 2 movements proportional to the numerical value of those keys.

The main operating hand lever 31 is pivoted to the side of the machine, in front of the path of travel of the carriage C, so that said carriage will not interfere with the operation of the lever, and so that the lever will be in a convenient position for operation. As previously explained, this lever 31 is connected by a link 67 to a segment 121 having ratchet teeth on its edge, and having a pin 122 adapted to engage the tail of a locking dog 123 pivoted at 124 to an arm 125, which arm 125 is pivoted about the same center on which segment 121 is pivoted. The arm 125 has a tail 126 with which the pin 122 of the segment 121 will engage during return motion of lever 31; some play of pin 122 being provided between the tail of dog 123 and the tail 126 of arm 125. When lever 31 is pulled forward, the pin 122 of segment 121 not only engages the tail of dog 124 to move that dog forward or anti-clockwise (and with it, the disk 127) but also moves under the tail of the dog 123, so as to hold the tooth of that dog in engagement with one of the notches 128 of disk 127. Owing to the play permitted pin 122 between the dog 123 and the tail 126 of the arm 125, during return movement of the lever 31, the pin 122 moves out from under the tail of the dog 123 before it engages the tail 126 of the arm 125; and by so moving out from under the tail of the dog 123 that dog is permitted to disengage from the notch 128 of disk 127 with which it has been in engagement. The shape of the tooth of dog 123 is such that, when that dog is moved backward, (as it will be when pin 122 in the return movement of lever 31 engages the tail 126 of arm 125) said tooth will move out of the notch 128 of disk 127 with which it has been in engagement, even against the tension of a spring 139 (Fig. 26) tending to hold that dog in engagement with the notch of the disk 127. In the construction shown, the disk 127 has five notches 128, and makes one-fifth of a complete revolution for each complete backward and forward stroke of lever 31; but mechanism to be described presently causes such one-fifth of a revolution of disk 127 to effect one complete rotation of the cam shaft 69, upon which parts 127, 125 and 121 are loosely mounted; also, mechanism hereinafter described insures one complete revolution of that cam shaft for each complete operation of lever 31.

Plate 127 has, as a part of it, a gear 130; and the tooth of dog 123 is of such breadth that when it engages a notch 128 of disk 127, it also enters between two teeth of the gear 130; thereby slipping of the gear 130 with respect to the disk 127 is prevented; in fact, the disk 127 is really nothing but a cam designed to lift the tooth of dog 123 out of the path of gear 130 during forward motion of arm 125, and to prevent that dog from engaging another tooth of gear 130 until that dog has been returned one-fifth of a circle. A pinion 131 on the shaft 153 intermeshes with gear 130; and secured to pinion 131 is a gear 133 on shaft 153 intermeshing with a pinion 68 on and keyed to a cam shaft 69, 131 and 133 being connected as one piece. The gears 130, 131, 133 and 68, form a gear train of ratio one to five, so that one-fifth of a rotation of gear 130 imparts one complete rotation to cam shaft 69.

Back of gear 130 there is a disk 135, keyed to gear 68 and shaft 69, and therefore rotating at five times the angular velocity of gear 130. This disk 135 has in it a notch adapted to be engaged by a tooth 136 of a pawl 137 pivoted on shaft 153 and having a retractile spring 138. Upon this shaft 153 is also pivoted a dog 139 adapted to engage the ratchet teeth on the periphery of sector 121, and having a pin 140 whereby dog 139 is held out of engagement with the teeth of sector 121, except when the tooth 136 of pawl 137 is lifted out of engagement with the notch of disk 135. It will be apparent that once lever 31 is pulled forward from its normal position, disk 135 is started in rotation, and in the first part of its rotation it cams the tooth 136 of pawl 137 out of engagement with its notch; so permitting dog 139 to drop into engagement with the ratchet teeth of segment 121. As sector 121 moves during the forward motion of lever 31, the dog 139 will ratchet over the ratchet teeth of sector 121; but will prevent any backward motion of segment 31 until, disk 135 having completed one full revolution, tooth 136 of pawl 137 drops into the notch of disk 135, so raising dog 139 out of engagement with ratchet teeth of sector 121. It will be clear, therefore, that if lever 31 be not given a full forward stroke, but attempt be made to push that lever 31 backward after a partial forward stroke, dog 139, engaging the ratchet teeth of sector 121, will prevent such return motion of lever 31; nor can lever 31 be returned until it has been moved to the extreme forward limit of its travel. A stop 141 is provided to determine the extreme rearward limit of motion of hand lever 31.

Referring to Figs. 11, 12 and 13. Upon cam shaft 69 there is a double cam 142—143, cam 142 having a follower 144, and cam 143 having a follower 145, both followers keyed to a shaft 146 upon which is mounted a torsional spring 147 connecting with shaft 146 with the arm 31ᵃ by which, and by link 32, gear sector 33 is operated. Upon the same shaft 146 is pinned an arm 148 having a pin 149 just in rear of arm 31ᵃ. It will be clear that when, during the rotation of shaft 69, the rise of cam 142 actuates follower 144, arm 148 will be moved to the right of Fig. 13, and the torsional spring 147 will also move arm 31ᵃ to the right of Fig. 13, so actuating gear segment 33 and gear 28 (Fig. 5). Gear 28 and gear segment 33 are permitted to move a greater or less distance, according to the particular multiplier key which has been depressed, and which arrests movement of gear 28 when pin 29 of rack bar 27 engages that depressed multiplier key; but the performance of other functions of the machine require that cam shaft 69 shall make a complete rotation for each stroke of operating lever 31; hence the torsion spring interposed between the shaft 146 and arm 31ª. When the time comes for the return motion of arm 31ª the rise of the cam 143, acting upon the follower 145, moves shaft 146 and arm 148 backward or toward the front of the machine, and the pin 149 on arm 148 engaging the rear of arm 31ª, moves that arm backward positively, insuring complete return of the rack bars 2 of the multiplicand keyboard, and the rack bar 27 of the multiplier keyboard.

The last or highest order feeler 43ˣ does not require a stepped product disk, since it is used only for carrying. Therefore, a stud 160 (Figs. 3 and 22) is provided to prevent that feeler from moving down with the other feelers. The operation of this last feeler 43ˣ in carrying or tens-transfer is the same as of the other feelers.

In Fig. 27 I have shown, diagrammatically, the various cams on the cam shaft 69, in their proper radial relation, and with their proper configurations, the diameters of these cams being, however, different from their actual diameters, in order that the profiles of the several cams may be apparent.

The machine will be inclosed in a large part in a suitable case, as indicated in Figs. 1, 2 and 2ª, much as an ordinary adding machine is inclosed in large part; but it is unnecessary to describe the details of such case, except to note that the dial wheels are inclosed within a casing 161 (Figs. 29 and 30) having in its openings 162 through which one numeral only of each dial wheel is visible to read products on the dial wheels without possibility of error.

In order to insure proper mesh of the teeth of gears 52 and 48 during lateral motion of the carriage, I provide on the carriage a so-called gate 163 (Figs. 29, 30 and 34), which is a toothed plate, the teeth of which are beveled as indicated particularly in Fig. 30, and engage the teeth of gears 48 when the teeth of gears 52 engage and disengage with said gears 48.

In Figs. 35, 36 and 37 I illustrate alternative and simple mechanism adapted to be operated by hand lever 31 for performing the functions of the mechanism illustrated in Figs. 23–26 inclusive. In Figs. 35–37 inclusive, as in Figs. 23–26 inclusive, there is a gear train 130—131—132—68 for communicating rotation from main operating lever 31 to cam shaft 69 and thence to other parts of the machine. The hand lever 31 is provided with a bell crank extension 31' connecting by a link 67 to a gear sector 164 mounted concentrically with respect to gear 130, but free to rotate with respect thereto in rest position of the mechanism. A pinion 165 is mounted upon a rocking lever 166 normally retracted by a spring 167; and in such retracted position the pinion is held locked by a plate 168; this plate insuring that, when the plate 166 is rocked forward, as hereinafter described, that pinion shall be in position to mesh properly with the teeth of gear 130. Gear sector 164 has pivoted to it a toggle link 169 provided with a notch 170 normally engaging a pin 171 on the link lever 166, said toggle link 169 having also a finger 172 adapted to continue the engagement of said toggle link with pin 171 as the gear sector 164 and rocking lever 166 move.

The operation is as follows: Supposing lever 31 to be pulled to the left, such motion causes rotation of gear sector 164 about its pivot, with resulting motion of the toggle lever 169 held by spring 173 against pin 171; and therefore as gear sector 164 moves anti-clockwise, the toggle lever rocks lever 166, bringing pinion 165 into mesh with gear 130. By this time the gear teeth of sector 164 will also mesh with the teeth of pinion 165, such pinion therefore serving as means for locking together sector 164 and gear 130. Gear 130 is therefore caused to revolve, and its motion is communicated through gears 131, 132 and 68 to the shaft 69. Integral with gear 68 is a disk 174 (see Fig. 36) having an annular rim in which is a notch 175 (Fig. 35); and the rocking lever 166 has a tooth 176 which lies within that notch 175 when the parts are in rest position, as shown in Fig. 35. But when lever 31 is moved as described, so rocking lever 166, the tooth 176 leaves the notch 175 and there being no other notch in the rim of disk 174, pinion 165 is held locked in joint engagement with gear 130 and gear sector 164 until one revolution of shaft 169 has been completed.

In practice, a stop, not shown, will be employed in connection with lever 31 so that this lever will be arrested when tooth 176 so comes opposite notch 175. Return motion of the lever 31, therefore, will permit tooth 176 to engage notch 175, and the spring 167 will retract swinging lever 166 and pinion 165, disconnecting gear sector 164 from gear 130, and permitting return of that gear sector 164 without reverse rotation of gear 130. Toggle link 169 has a heel 177 adapted to be engaged by a pin 178 carried by the gear sector 164 whereby the motion of the toggle link is so limited that it will always be in engagement with pin 171.

It is desirable that the keys of the multiplicand keyboard shall be restored or raised at the time of the return of the carriage during the clearing operation. Of course, such restoration may be effected by depressing the "0" keys 1ˣ, but it is obviously preferable that such restoration shall be effected by the return of the carriage and without any other operation. In Figs. 38 to 42 I illustrate means for this purpose. It will be recalled that when any one of the multiplicand keys 1 is depressed, its wedge shaped lower end moves the rollers 13 within the guide 11. Such motion of the rollers acts upon a pusher 179, which pusher in turn acts upon a lever 180 fixed on a transverse rock shaft 181 (there being one such pusher 179 and lever 180 for each column of keys of the multiplicand keyboard. The upper or "9" key of each column of the multiplier keyboard acts directly upon the corresponding pusher 179 instead of acting on said pusher through the medium of a roller 13). Rock shaft 181 is provided with an arm 182, the end of which is beneath a vertically movable slide rod 183 having a beveled top 184 as shown particularly in Fig. 42. The carriage C is provided with a pawl 185 having a corresponding beveled surface. It will be seen that the depression of any multiplicand key moves out the corresponding pusher 179 so raising the slide rod 183 into the path of the pawl 185 of the carriage. Consequently, during the return of the carriage, the carriage pawl 185 will engage such slide rod 183, and press the same down, so pressing back or toward the front of the machine any of the pressers 179 which may have previously been pressed out, and thereby restoring or lifting to normal position any of the multiplicand keys which may have been depressed. The pawl 185 is pivoted and spring actuated, and therefore may yield to pass the slide rod 183 during the stepping of the carriage to the right incident to the multiplying operation.

It is convenient to provide a single key whereby all depressed keys of the multiplicand keyboard may be restored or lifted when desired. To this end I have provided a key 186 (Figs. 38 and 41) connected to shaft 181 by a bell crank 187, link 188 and lever arm 189. It will be apparent that depressing key 186 causes the restoration of any of the multiplicand keys which may have been depressed.

It is desirable to provide means for locking the multiplicand keyboard against depression of any further keys after the multiplying operation has been started. To this end, I provide, in connection with each column of keys of the multiplicand keyboard, a slide bar 190 (Figs. 38, 39 and 40) carrying hooks 191 adapted, in one position of that bar 190, to engage corresponding pins 192 of the several keys 1, and thereby to prevent depression of such keys. Normally, the hooks 191 are out of engagement with the pins 192; but when, after the setting up of a multiplicand by the depression of appropriate keys of the multiplicand keyboard, the multiplication operation has been begun by the depression of a multiplier key and actuation of the main operating lever 31, the first effect of movement of the rack bar 27 (see Figs. 38 and 5) of the multiplier keyboard, is to permit the dropping of an arm 193 (Fig. 38) resting upon the pin 29 of that rack bar 27, whereupon a spring 194 acting upon a lever arm 195 connected to said arm 193, draws forward said lever 195 and with it the locking bar 190, so advancing the hooks 191 as to prevent depression of any further keys of the multiplicand keyboard until that rack bar 27 has been returned to normal position following the completion of that multiplication operation. Similarly, such of the multiplicand keys as have been depressed are retained in depressed position by their corresponding hooks 191. Upon return of the rack bar 27 its pin 29 raises arm 193, so moving bar 190 and unlocking the multiplier keys.

By this interlocking of the multiplicand and multiplier keyboard mechanisms, alteration of the intended multiplicand, accidental or otherwise, after the multiplying operation is started, is prevented. Before the multiplication operation is started, any mistake in setting up the multiplicand may be corrected without affecting the multiplying mechanism; but depression of a multiplicand key, or restoration of a multiplicand key, accidental or otherwise, after the beginning of the movement of the lever 31, might affect the product of such multiplication, except for the interlocking arrangement just described.

*Addition.*

It is quite possible to use my machine as an adding machine, instead of as a multiplying machine. In general, it may be stated that addition is performed by setting up the several numbers to be added, one after another, in the multiplicand keyboard, and multiplying each such number by one, progressive stepping of the carriage to the right being avoided, in order that the several items added may accumulate without alteration of "place" in the indicating mechanism of the carriage. To avoid repeated depression of the "1" key of the multiplier keyboard, and alteration of "place", I provide a shifting lever, operation of which makes unnecessary depression of such "1" key, and causes return of the carriage after each half step to the right. The adding mechanism is shown particularly in Figs. 43 and 44. In these figures I show the mechanism already described, and comprising cams 81 and 82, and pawls 78 and 79 and ratchet wheel 77, for stepping the carriage progressively, and in half-step stages, to the right; but I have shown the ratchet wheel 77 as connected to feed wheel 75 through a clutch collar 196 splined to shaft 76 and operable by means of a shifting lever 197. In the position of the parts shown in Fig. 44, the clutch collar 196 is in engagement with the ratchet wheel 77 for multiplication. By shifting the lever 197, the clutch collar 196 is disengaged from ratchet wheel 77 and is engaged with the hub of a lever 198 free to turn on the shaft 76 of the feed wheel 75 and connected by a link 199 to an arm 200 projecting from the cam-actuated reciprocating member 80 which is caused to move forward and back by the cams 81 and 82. It will be apparent that when the clutch collar 196 is in engagement with lever 198, and when cam shaft 69 is rotated, the lever 198 and shaft 76 will be oscillated, but not rotated; in other words, under such circumstances the carriage will be moved a half step to the right and then will be returned to the left. It will be recalled that it is necessary to move the carriage a half step to the right in order to bring the gears 52 carried by that carriage into mesh with the gears 48 through which motion is transmitted from the multiplying mechanism to the indicating means of the carriage. In multiplication, as distinguished from addition, it is necessary, after each transfer of a partial product to the indicating mechanism of the carriage, that the carriage shall be moved a further half-step to the right, in order that the partial product next transferred to the indicating mechanism may have the full value corresponding to the "place" of the corresponding multiplier digit. But in addition, the multiplier is "1" in the units column or "place"; and therefore there is no occasion for shifting the carriage, other than such shifting as is required to bring the indicating mechanism of the carriage into driving connection with the multiplying mechanism. Hence the provision for moving the carriage back through one half space after each transfer of an addition item to that indicating mechanism.

To avoid occasion for depression of the "1" key of the multiplier keyboard, in such addition operations, the lever 197 is provided with a link 201 whereby, when said lever 197 is shifted backward or to the right (as viewed in Fig. 44) to the addition position, motion is communicated through a lever 202, rock shaft 203 and another lever 204 to the bar 18 (see Figs. 44 and 5) whereby the lock lever 26 for the rack bar 27 of the multiplier keyboard mechanism is raised out of locking position with relation to the rack bar 27. Also, there is a finger 205, in connection with the shifting arm 206 operated by lever 197, which finger 205 is moved, by the shifting of lever 206 (incident to throwing the lever 197 from multiplying to adding position) into position to engage a pin 207 on an arm 208 on the shaft 30 by which the gear 28 driving the rack bar 27 is moved. The length of this finger 205 is such as to arrest the rack bar 27 just as that rack bar would have been arrested if the "1" key of the multiplier keyboard had been depressed. In Fig. 44 this finger 205 is shown, in dot and dash lines, in such arresting position.

The top plate 15 covering the mechanism associated with the multiplicand and multiplier keys is provided with a slot 209 (Fig. 47) for the lever 197, said lever having two notches 210 and 211 for that lever, of which 210 corresponds to "multiplication" position of the lever and 211 corresponds to "addition" position for said lever. In shifting from one position of the lever to the other, said lever is sprung slightly to the left, and then may be moved from one position to the other. Addition is performed, therefore, in the following manner: Lever 197 having been shifted into notch 211, so dropping the finger 205 in position to cause the arrest or rack bar 27 after the latter has moved through the space through which it would move if the "1" key of the multiplier keyboard were depressed, the lock lever 26 for the rack bar 27 being raised at the same time, to leave that rack bar free to move, the first addition item is set up in the multiplicand keyboard, and the main operating lever 31 is operated, whereby the carriage C is moved one half space to the right so as to bring its gears 52 in mesh with the gears 48 of the multiplying mechanism, and then that item is transferred to the dial wheels of the carriage, the carriage then moving back to the left one half space. The next item to be added is then set up in the multiplicand keyboard, and the lever 31 operated again, and so on. The same restoring device for the multiplicand keys illustrated in Fig. 42, resets or restores the multiplicand keys after each such multiplying operation; and Figs. 45 and 46 illustrate the members 184 and 185 of this restoring device in greater detail and on a larger scale than they are illustrated in Fig. 42, Fig. 46 showing the parts in the position occupied just before the restoration operation, (which restoration operation occurs during the half step of the carriage to the left occurring after the transfer of each addition item to the indicating mechanism of the carriage); while Fig. 45 shows the parts in the position occupied just after such restoration has been effected.

While for simplicity of illustration the means whereby my machine is rendered adaptable for adding as well as for multiplication, is omitted in Fig. 29 and various other figures, and may be omitted from the machine altogether, yet in general I consider it preferable that the machine be provided with means such as shown in Figs. 43, 44 and 47, or equivalent means, enabling the machine to perform addition, as well as multiplication.

It will be apparent that, in the transfer of partial products from the rack bars of the multiplicand keyboard, through the product disks 5—5ª and feelers to the product indicating mechanism of the carriage, the product disks 5—5ª are mere intermediaries convenient for engagement by the feelers; that what is really done is to transfer, by means of the feelers, to the indicating means of the carriage, motion of said rack bars which is proportional to the partial products; the product disks 5—5ª being merely means to that end.

What I claim is:—

1. A computing machine, comprising in combination a plurality of movable product-members, operating means for said members comprising gear members adapted to move said product-members to positions corresponding to various products, multiplicand receiving means comprising pinions of various gear ratios with respect to corresponding gear-members above mentioned, such gear ratios corresponding to various multiplicand digits, a main operating member, means whereby the setting up of a multiplicand operatively connects such operating member, through pinions corresponding to the digits of that multiplicand, to gear members corresponding to such pinions of the multiplicand, and multiplier receiving means arranged to cause such multiplicand pinions to move through distances corresponding to various multipliers, when operated by said main operating member.

2. A computing machine, comprising in combination a plurality of movable product-members, operating means for said members comprising gear-members adapted to move said product-members to positions corresponding to various products, multiplicand-receiving means comprising pinions of various gear ratios with respect to corresponding gear-members above mentioned, such gear ratios corresponding to various multiplicand digits, such pinions normally out of operative connection with their corresponding gear members but arranged to be operatively connected thereto selectively by the setting up of a multiplicand, and multiplier receiving means arranged to cause such multiplicand pinions when operated to move through distances corresponding to various multipliers.

3. A computing machine, comprising in combination a plurality of movable product-members, operating means for said members comprising gear-members adapted to move said product-members to positions corresponding to various products, multiplicand-receiving means comprising pinions of various gear-ratios with respect to corresponding gear members above mentioned, such gear ratios corresponding to various multiplicand digits, such pinions normally out of mesh with their corresponding members, but arranged to be placed in mesh selectively with said gear members by the setting up of a multiplicand, and multiplier receiving means arranged to cause such multiplicand pinions when operated to move through distances corresponding to various multipliers.

4. A computing machine, comprising in combination a plurality of movable product-members, operating means for said members comprising gear-members adapted to move said product-members to positions corresponding to various products, multiplicand-receiving means comprising pinions of various gear-ratios with respect to corresponding gear members above mentioned, such gear ratios corresponding to various multiplicand digits, a main operating member, said pinions arranged to transmit motion from said operating member to their corresponding gear-members and being normally out of operative motion-transmitting relation therewith, but adapted to be placed in such operative motion-transmitting relation by the setting up of a multiplicand, and multiplier receiving means arranged to cause such multiplicand pinions, when operated, to move through distances corresponding to different multipliers.

5. A computing machine, comprising in combination a plurality of movable product-members, operating means for said members comprising gear-members adapted to move said product-members to positions corresponding to various products, multiplicand-receiving means comprising pinions of various gear-ratios with respect to corresponding gear-members above mentioned, such gear ratios corresponding to various multiplicand digits, a main operating member, said pinions arranged to transmit motion from said operating member to their corresponding gear-members and being normally out of mesh therewith but adapted to be placed in mesh therewith by the setting up of a multiplicand, and multiplier receiving means arranged to cause such multiplicand pinions, when operated, to move through distances corresponding to different multipliers.

6. A computing machine, comprising in combination a plurality of movable stepped product-disks, operating means for said disks comprising rack bars adapted to move such disks to positions corresponding to various products, multiplicand-receiving means, comprising pinions of various gear-ratios with respect to corresponding rack bars above mentioned, such gear-ratios corresponding to various multiplicand digits, a main operating member, means whereby the setting up of a multiplicand operatively connects such operating member, through pinions corresponding to the digits of that multiplicand, to rack bars corresponding to such pinions of the multiplicand, and multiplier receiving means arranged to cause such multiplicand pinions to move through distances corresponding to various multipliers, when operated by said main operating member.

7. A computing machine, comprising in combination a plurality of movable stepped product disks, operating means for said disks comprising rack bars adapted to move said disks to positions corresponding to various products, multiplicand receiving means comprising pinions of various gear ratios with respect to corresponding rack bars above mentioned, such gear ratios corresponding to various multiplicand digits, such pinions normally out of mesh with their corresponding rack bars, but arranged to be placed in mesh therewith selectively by the setting up of a multiplicand, and multiplier receiving means arranged to cause said multiplicand pinions, when operated, to move through distances corresponding to various multipliers.

8. A computing machine, comprising in combination a plurality of movable stepped product-disks, operating means for said disks comprising rack bars adapted to move said disks to positions corresponding to various products, multiplicand receiving means comprising pinions of various gear ratios with respect to corresponding rack bars above mentioned, such gear ratios corresponding to various multiplicand digits, a main operating member, said pinions arranged to transmit motion from said operating member to their corresponding rack bars and being normally out of mesh with their rack bars but adapted to be placed in mesh therewith selectively by the setting up of a multiplicand, and multiplier receiving means arranged to cause said multiplicand receiving means when operated to move through distances corresponding to different multipliers.

9. A computing machine comprising in combination a plurality of product-members provided with operating gears, rack bars in mesh with said gears, and multiplicand-receiving means and multiplier-receiving means comprising coöperating means arranged to move such rack bars distances proportional to various products.

10. A computing machine comprising in combination a plurality of product members, each comprising two members, one for lower-order digits and the other for higher-order digits, with a connected gear wheel, gear members intermeshing with the said product member gears, and multiplicand-receiving means and multiplier-receiving means comprising coöperating means engaging said gear-members and arranged to move same through distances proportional to various products.

11. A computing machine comprising in combination a product member, product-member-operating means therefor comprising a gear member adapted to move such product member, and a multiplicand keyboard comprising a column of keys, pinions corresponding to the keys of such column arranged each to be connected operatively by actuation of the corresponding key to the corresponding gear member and when so connected to transmit to that gear member motion proportional to the numerical value of the corresponding key, such pinions being normally out of such operative connections, and means for operating said pinions.

12. A computing machine comprising in combination a product member, product-member-operating means therefor comprising a gear member adapted to move such product-member, and a multiplicand keyboard comprising a column of keys, pinions corresponding to the keys of such column arranged each to be connected operatively by actuation of the corresponding key to the corresponding gear member and when so connected to transmit to that gear member motion proportional to the numerical value of the corresponding key, such pinions being normally out of such operative connection, and multiplier-receiving means comprising means for rotating said pinions distances proportional to various multipliers.

13. A computing machine comprising in combination a product member having a connected gear wheel, a rack bar in mesh with said gear, and a multiplicand keyboard comprising a column of keys, pinions corresponding to the keys of such column arranged each to be connected operatively by actuation of the corresponding key to said rack bar and when so connected to transmit to that rack bar motion proportional to the numerical value of the corresponding key, said pinions being normally out of such operative connection, and means for operating said pinions.

14. A computing machine comprising in combination a product member having a connected gear wheel, a rack bar in mesh with said gear, and a multiplicand keyboard comprising a column of keys, pinions corresponding to the keys of such column arranged each to be connected operatively by actuation of the corresponding key to said rack bar and when so connected to transmit to that rack bar motions proportional to the numerical value of the corresponding key, said pinions being normally out of such operative connection, and multiplier-receiving means comprising means for rotating said pinions distances proportional to various multipliers.

15. A computing machine comprising in combination a column of keys, a corresponding gear member, slidably mounted pinions each corresponding to one of said keys, said pinions normally occupying positions to the right and to the left, alternately, with respect to said gear member, and means actuated by the actuation of each of such keys for moving its corresponding pinion into mesh with said gear member.

16. A computing machine comprising in combination a column of keys having stems provided with wedge shaped portions, a guide way in which said stems work, rollers within said guide way and arranged to be actuated by the said wedge shaped portions of any one of said keys, as the latter is depressed, and when so actuated to restore any previously depressed key, whereby a key, when actuated, restores any other previously depressed key, a rack bar mounted to slide relative to said guide way, pinions, one for each such key, normally out of mesh with said rack bar, and means actuated by the actuation of each key for moving the corresponding pinion into mesh with said rack bar.

17. A computing machine comprising in combination a multiplicand keyboard comprising a plurality of columns of keys, the keys of such columns arranged in transverse rows of corresponding numerical values, a gear member for each such column, pinions corresponding to the several keys of such columns arranged each to be connected operatively to the gear member of its column by actuation of the corresponding key and when so connected to transmit to that gear member motion proportional to the numerical value of the corresponding key, means operatively connecting said pinions whereby all may rotate together, a multiplier receiving device, and means for rotating said pinions through distances corresponding to various multipliers.

18. A computing machine comprising in combination a column of numbered keys, a movable gear member corresponding to such column, and pinions, one for each such key, arranged to be connected operatively to that gear member by actuation of the corresponding key, the pinions from that corresponding key to an intermediate one of such keys onward being of pitch diameters corresponding to the numerical values of their respective keys, and constituting a sub-group of such pinions, means for connecting together to move at the same angular speed the pinions of such sub-group, the other pinions not included in such group being of diameters greater than the pitch diameter which would correspond to the numerical value of their corresponding keys at the ratio selected for the pinions of the sub-group mentioned, and gear means connecting the pinions of such sub-group with the other pinions mentioned, and arranged to cause such other pinions each to transmit to said gear member motion corresponding to the numerical value of its corresponding key.

19. A computing machine comprising in combination a column of numbered keys, a movable gear member corresponding to such column, and pinions, one for each such set, arranged to be connected operatively to that gear member by actuation of the corresponding key, the pinions from that corresponding to an intermediate one of such keys onward being of pitch diameters corresponding to the numerical values of their respective keys, and constituting a sub-group of such pinions, means for connecting together to move at the same angular speed the pinions of such sub-group, the other pinions not included in such group being of diameters greater than the pitch diameters which would correspond to the numerical values of their corresponding keys at the ratio selected for the pinions of the sub-group mentioned, a further gear member, connected to one of the members of the gear train comprising such sub-group of pinions and first mentioned gear member, and gears intermeshing with the further gear member mentioned, and operatively connected with those pinions not included within the sub-group mentioned, and of pitch diameters appropriate to cause such pinions not included in the sub-group mentioned to transmit to the first mentioned gear member motion corresponding to the numerical values of their corresponding keys.

20. A computing machine comprising in combination a column of numbered keys, a movable gear member corresponding to such column, and pinions, one for each such key, arranged to be connected operatively to that gear member by actuation of the corresponding key, the pinions from that corresponding to an intermediate one of such keys onward being of pitch diameters corresponding to the numerical values of their respective keys, and constituting a sub-group of such pinions, a rack bar and gear means intermeshing therewith connecting together to move at the same angular speed all of the pinions of such sub-group, a gear sector connected to one of the members of the gear train comprising such rack bar and sub-group pinions, and gears intermeshing with such gear sector and each operatively connected with one of the key-pinions not included in the sub-group mentioned, the said gears being each of a pitch diameter appropriate to cause its corresponding key-pinion to transmit to the gear member motion corresponding to the numerical value of its corresponding key.

21. A computing machine comprising in combination a plurality of product members, product-member operating means therefor, comprising gear members adapted to move such product members to positions corresponding to various products, multiplicand and multiplier keyboards each comprising a set of numbered keys, a main operating device, and means for transmitting motion from said main operating device to said gear members proportional to the products of the various multiplicands by various multipliers, comprising gears operated by the keys of one of the sets mentioned, and of pitch diameters proportional to the numerical values of their corresponding keys, and comprising also means, operated by the keys of the other set mentioned, causing said gears to move through distances proportional to the numerical value of the keys of such other set.

22. A computing machine comprising in combination a plurality of product members, gear members adapted to move such product members to positions corresponding to various products, a plurality of columns of numbered multiplicand keys, a column of multiplier keys, gears corresponding each to one of said multiplicand keys, and arranged to be drawn into mesh with the corresponding product-member operating gear member by actuation of that key, and each of a pitch diameter corresponding to the numerical value of that multiplicand key, a main operating device arranged to rotate such gears, and means operated by the several multiplier keys causing each such gear, when operated by the main operating device, to rotate through an angle proportional to the numerical value of such multiplier key.

23. In a computing machine, the combination of a longitudinally movable gear member, a main operating member and a pinion operated thereby and in mesh with said gear member for operating the latter, numbered keys each arranged to engage such gear member to limit motion of the latter to an extent proportional to the numerical value of such key, a lock for such gear member, normally engaging the latter, and means operated by the depression of any one of such keys for moving such lock out of locking relation with said gear member.

24. In a computing machine, the combination of a longitudinally movable gear member, a main operating member and a pinion operated thereby and in mesh with said gear member for operating the latter, numbered keys each arranged to engage such gear member to limit motion of the latter to an extent proportional to the numerical value of such key, a lock for such gear member, normally engaging the latter, and means operated by the depression of any one of such keys for moving such lock out of locking relation with said gear member, and for locking against depression the other said keys.

25. In a computing machine, the combination of a longitudinally movable gear member, means for moving the same, numbered keys each arranged when depressed to engage such gear member to limit motion of the latter to an extent proportional to the numerical value of such key, said keys having capacity both for depression and for oscillation, spring means for each such key adapted to restore same and also to cause oscillation of the key when the latter is depressed, locking means arranged to lock down each key when so depressed by reason of the oscillation thereof incident to its depression, means for preventing depression of other keys while one of said keys is in depressed position, and means operated by said gear member, when operated, for releasing such depressed key from its locking means, and for holding such key depressed until return of said gear member.

26. In a computing machine, the combination of a longitudinally movable gear member, means for moving the same, numbered keys each arranged when depressed to engage such gear member to limit motion of the latter to an extent proportional to the numerical value of such key, said keys having capacity both for depression and for oscillation, spring means for each such key adapted to restore same and also to cause oscillation of the key when the latter is depressed, locking means arranged to lock down each key when so depressed by reason of the oscillation thereof incident to its depression, means operated by said gear member, when operated, for locking against depression keys not already depressed, and means also operated by said gear member, when operated, for releasing such depressed key from its locking means, and for holding such key depressed until return of said gear member.

27. In a computing machine the combination of a longitudinally movable gear member, means for moving the same, numbered keys each arranged when depressed to engage such gear member to limit motion of the latter to an extent proportional to the numerical value of such key, said keys having capacity both for depression and for oscillation, spring means for each such key adapted to restore same and also to cause oscillation of the key when the latter is depressed, locking means to lock down each key when so depressed, by reason of the oscillation thereof incident to its depression, a locking bar adapted to engage keys not depressed, and to hold same against depression, means operated by the gear member when operated for operating such locking bar, and means operated by said gear member, when operated, for releasing such depressed key from its locking means, and for holding such key depressed until return of said gear member.

28. In a computing machine the combination of a plurality of product members, means for moving said members to positions representing partial products, feelers adapted to engage such product members after the latter have been operated to represent partial products, product-indicating means, means for restoring such feelers to a normal position after engagement with such product members, and means operated by the feelers during such restoration, for transferring to the product indicating means the complete partial products to which such product members have been set.

29. In a computing machine the combination of a plurality of product members, means for moving said members to positions representing partial products, feelers adapted to engage such product members after the latter have been operated to represent partial products, product-indicating means, means for restoring such feelers to a normal position after engagement with such product members, and means operated by the feelers during such restoration, for transferring to the product indicating means the complete partial products to which such product members have been set, and tens-transferring means arranged to cause further operation of said feelers for the transfer of tens.

30. A computing machine comprising in combination a plurality of double product members each comprising two members, one adapted to represent lower order digits and the other higher order digits of partial products, means for operating said members, two feelers for each such double product member, one corresponding to the lower order digit member, and the other to the higher order digit member, product-indicating means, and means for the transfer of partial products from such product members to such product-indicating means comprising differential gear sets each having two driving gears and means for the transfer of motion corresponding to the summation of the operation of such driving gears to the product-indicating means, the lower order of each pair of feelers arranged to operate a driving gear of one such gear set, and the higher order feeler of each pair of feelers arranged to operate a driving gear of a gear set next beyond.

31. A computing machine comprising in combination a plurality of double product members each comprising two members, one adapted to represent lower order digits and the other higher order digits, means for operating said members, two feelers for each such double product member, one corresponding to the lower order digits and the other to the higher order digits, one corresponding to the lower order digit member and the other to the higher order digit member, product-indicating means, and means for the transfer of partial products from such product members to such product-indicating means comprising differential gear sets each having two driving gears and means for the transfer of motion corresponding to the summation of the operation of such driving gears to the product-indicating means, the lower order feeler of each pair of feelers arranged to operate a driving gear of one such gear set, and the higher order feeler of each such pair of feelers arranged to operate the driving gear of a gear set next beyond, and tens-transferring means arranged to cause further operation of said feelers for the transfer of tens.

32. In a computing machine, the combination of a plurality of product members, means for moving said product members to positions representing partial products, feelers for such product members, product-indicating means, means operated by the feelers under control of such product members for transfer of partial products to said product-indicating means, and means, operated by operation of such product-indicating means, for causing further operation of said feelers for the transfer of tens.

33. In a computing machine, the combination of a plurality of product members, means for moving said product members to positions representing partial products, feelers for said product members, product-indicating means, means for moving said feelers into engagement with said product members after the latter have been set to correspond to partial products, and then for restoring said feelers, means operated by said feelers during their restoration for transferring to the product-indicating means the partial products to which such product members have been set, said product-indicating means comprising means arranged to move said feelers backward beyond their normal positions for the transfer of tens.

34. A computing machine comprising in combination a plurality of product members, means for moving said members to positions representing partial products, feelers for said members, means for bringing said feelers into engagement with said members after the latter have been set to represent partial products, and then for restoring said feelers, a movable carriage, product-indicating means carried by said carriage, means operated by said feelers for communicating motion to said product-indicating means and comprising gears carried by said carriage, and other gears arranged to be driven by said feelers during the return motion thereof, and to mesh with said carriage gears, but to permit such carriage gears to move laterally into and out of mesh; said carriage gears being out of mesh with the feeler-driven gears normally, means for moving the carriage laterally to bring the gears into mesh at the beginning of a multiplication operation, and to hold them in such mesh during the return of the feelers and the transfer of the partial products to such product-indicating means, and then to move such carriage laterally to bring the gears out of mesh; and clearing means adapted to be operated to restore the product indicating means to zero while the carriage gears are out of mesh with the feeler-operated gears.

35. A computing machine comprising in combination a plurality of double product members each comprising two members, one adapted to represent lower order digits and the other higher order digits of partial products, means for moving said members to positions representing partial products, two feelers for each such double member, one corresponding to the lower order digit member, and the other to the higher order digit member, product-indicating means comprising a plurality of indicating members, means operated by said feelers for the transfer of partial products from such product-members to such indicating members of the product-indicating means, each higher order feeler arranged to operate a member of the product-indicating means of higher order than that member of such product-indicating means operated by the corresponding lower-order feeler, and separate transfer means for said several indicating means, each such transfer means operating a feeler of a higher order than the feeler which operates such indicating means.

36. In a computing machine, the combination of a plurality of product members, means for moving said members to positions representing partial products, feelers for said members, product-indicating means comprising a plurality of indicating members, means operated by said feelers under control of said product members for transfer of partial products to such product-indicating means, and separate transfer means for said several indicating means, each such transfer means operating a feeler of a higher order than the feeler which operates the indicating means, by which such transfer means is operated.

37. In a computing machine, the combination of a plurality of double product members each comprising two members one adapted to represent lower order digits and the other higher order digits of partial products, means for moving said members to positions representing partial products, two feelers for each such double member, one corresponding to the lower order digit member and the other to the higher order digit member, product-indicating means comprising a plurality of indicating members, means operated by said feelers under control of said product members for transfer of partial products to such product-indicating means, each higher order feeler arranged to operate a member of the product-indicating means of higher order than the product indicating means operated by the corresponding lower-order feeler, and separate transfer means for said several indicating means, each such transfer means operating a feeler of a higher order than the feeler which operates the indicating means, by which such transfer means is operated.

38. In a computing machine, the combination of a plurality of product members, means for moving said product members to positions representing partial products, feelers for said product members, cam-operated means arranged to cause motion of said feelers into contact with said product members after the latter have been set to represent a partial product, and then to restore such feelers to normal position, product-indicating means, means operated by said feelers for transferring partial products to such product-indicating means, and separate transfer means for said several indicating means, each such transfer means operating a feeler of a higher order than the feeler which operates the indicating means by which such transfer means is operated.

39. In a computing machine, the combination of a plurality of product members, means for moving said product members to positions representing partial products, feelers for said product members, cam-operated means arranged to cause motion of said feelers into contact with said product members after the latter have been set to represent a partial product, and then to restore such feelers to normal position, product-indicating means, means operated by said feelers for transferring partial products to such product-indicating means, and separate transfer means for said several indicating means, each such transfer means operating a feeler of a higher order than the feeler which operates the indicating means by which such transfer means is operated, and arranged to move said feelers of higher order beyond its normal position for transfer to a higher order indicating means.

40. In a computing machine, the combination of a plurality of product members, means for moving said product members to positions representing partial products, feelers for said product members, means arranged to cause motion of said feelers into contact with said product members after the latter have been set to represent a partial product, and then to restore such feelers to normal position, said product-indicating means comprising a plurality of indicating members, each operated by one of such feelers, and separate transfer means for said several indicating means, each comprising a catch adapted to engage a feeler of higher order than the feeler which operates the indicating means by which such transfer means is operated, and then to move said feeler of higher order beyond normal position for transfer of tens.

41. In a computing machine, the combination of a plurality of product members, means for moving said product members to positions representing partial products, feelers for said product members, means arranged to cause motion of said feelers into contact with said product members after the latter have been set to represent a partial product, and then to restore such feelers to normal position, said product-indicating means comprising a plurality of indicating members, each operated by one of such feelers, and separate transfer means for said several indicating means, each comprising a catch adapted to engage a feeler of higher order than the feeler which operates the indicating means by which such transfer means is operated, and then to move said feeler of higher order beyond normal position for transfer of tens, and means for freeing the feelers from said catches after the transfer operation.

42. In a computing machine, the combination of a plurality of product members, means for moving said product members to positions representing partial products, feelers for said product members, means arranged to cause motion of said feelers into contact with said product members after the latter have been set to represent a partial product, and then to restore such feelers to normal position, said product-indicating means comprising a plurality of indicating members, each operated by one of such feelers, and separate transfer means for said several indicating means, each comprising a power-operated member and a catch thereon adapted to engage a feeler of higher order than the feeler which operates the indicating means by which such transfer means is operated, and then to move said higher order feeler beyond normal position for transfer of tens, and means operated by each such product-indicating means for engaging such catch with its corresponding feeler.

43. In a computing machine, the combination of a plurality of product members, means for moving said product members to positions representing partial products, feelers for said product members, means arranged to cause motion of said feelers into contact with said product members after the latter have been set to represent a partial product, and then to restore such feelers to normal position, said product-indicating means comprising a plurality of indicating members, each operated by one of such feelers, and separate transfer means for said several indicating means, each comprising a power-operated member and a catch thereon adapted to engage a feeler of higher order than the feeler which operates the indicating means by which such transfer means is operated, and then to move said higher order feeler beyond normal position for transfer of tens, and means operated by each such product-indicating means for engaging such catch with its corresponding feeler, and means for freeing the feelers from said catches after the transfer operation.

44. In a computing machine, the combination of a plurality of product members, means for moving said product members to positions representing partial products, feelers for said product members, means arranged to cause motion of said feelers into contact with said product members after the latter have been set to represent a partial product, and then to restore such feelers to normal position, such product-indicating means comprising a plurality of indicating members, each operated by one of said feelers, and separate transfer means for said several indicating means, each comprising a driving cam and a member operated thereby provided with a catch adapted to engage a feeler of higher order than the feeler which operates the indicating means by which such transfer means is operated, and then to move said higher order feeler for transfer of tens, each such indicating member comprising means for causing engagement of its corresponding catch with the feeler to which that catch corresponds, for transfer of tens; and means for operating said driving cams.

45. In a computing machine, the combination of a plurality of product members, means for moving said product members to positions representing partial products, feelers for said product members, means arranged to cause motion of said feelers into contact with said product members after the latter have been set to represent a partial product, and then to restore such feelers to normal position, such product-indicating means comprising a plurality of indicating members, each operated by one of said feelers, and separate transfer means for said several indicating means, each comprising a driving cam and a member operated thereby provided with a catch adapted to engage a feeler of higher order than the feeler which operates the indicating means by which such transfer means is operated, and then to move said higher order feeler for transfer of tens, each such indicating member comprising means for causing engagement of its corresponding catch with the feeler to which that catch corresponds, for transfer of tens; and means for operating said driving cams, said cams being retarded relatively to one another from one side of the machine to the other, in order that the transfer of tens may proceed progressively from one side of the machine to the other.

46. In a computing machine, the combination of a plurality of product members, means for moving said product members to positions representing partial products, feelers for said product members, means, comprising a controlling frame common to said feelers, and cam means for operating said frame, arranged to cause motion of said feelers into contact with said product members after the latter have been set to represent a partial product, and then to restore such feelers to normal position, said product-indicating means comprising a plurality of indicating members, and power-operated means provided with catches each arranged to be operated by one of said indicating means, and when so operated, to engage a feeler of higher order than the feeler corresponding to such particular indicating means, and then to move said feeler beyond normal position for transfer of tens, the said frame comprising means for the release of said catches after the transfer operation.

47. In a computing machine, the combination with product-indicating means comprising a plurality of separate indicating members, and means for communicating motion to said indicating members comprising a differential gear set for each such member, each such differential gear set comprising a plurality of driving gears, a single driven gear arranged to communicate motion to the corresponding indicating means, and planetary gears intermediate said driving gears and said driven gear, and operating means for said planetary gear sets comprising a plurality of double product-members each comprising two members, one adapted to represent lower order digits and the other higher order digits, means for moving said product members to positions representing partial products, two feelers, one for the lower order product member and the other for the higher order product member of each such double member, and means for operating said feelers, the lower order feeler of each such pair of feelers arranged to operate a driving gear of one such planetary set, and the higher order feeler of such pair of feelers arranged to operate a driving gear of the planetary set of a higher order.

48. In a computing machine, the combination with a double product member comprising two connected members, one adapted to represent lower order digits and the other higher order digits of partial products, and a gear wheel common to said two members, of a gear member adapted to engage such gear wheel, and means for operating said gear member arranged to move same distances proportional to various products.

49. In a computing machine, the combination with a double product member comprising two connected members, one adapted to represent lower order digits and the other higher order digits of partial products, and a gear wheel common to and intermediate said two members, of a gear member adapted to engage such gear wheel, and means for operating said gear member arranged to move same distances proportional to various products.

50. A computing machine comprising in combination a movable carriage, product-indicating means carried thereby, means for communicating motion to such product-indicating means, comprising gear mechanism, and means for stepping said carriage to one side progressively, such gear mechanism comprising means whereby said product-indicating means is out of driving relation with said gear mechanism in certain positions of said carriage, and is in driving relation with said gear mechanism in intermediate positions of said carriage.

51. A computing machine comprising in combination a movable carriage, product-indicating means carried thereby, means for communicating motion to such product-indicating means comprising gear mechanism, and means for stepping said carriage to one side progressively, such gear mechanism comprising means whereby said product-indicating means is out of driving relation with said gear mechanism in certain positions of said carriage, and is in driving relation with said gear mechanism in intermediate positions of said carriage, and clearing means for said indicating means comprising means adapted for restoring said indicating means to zero while said indicating means is out of driving relation with said gear mechanism.

52. A computing machine comprising in combination a movable carriage, product-indicating means carried thereby and comprising a plurality of separately movable indicating members, means for transferring partial products to said indicating means comprising separate driving means for each such indicating member, means for stepping said carriage to one side progressively after each such transfer of a partial product, the driving means for the several indicating members being out of driving relation with their corresponding indicating members after each such stepping operation, but being in driving relation with their respective indicating members at an intermediate point in each such stepping operation, and clearing means adapted to return the indicating members to zero when said members are out of driving relation with their respective driving means.

53. A computing machine comprising in combination a movable carriage, product-indicating means carried thereby and comprising a plurality of separately movable indicating means, feed means for stepping said carriage to one side progressively, means for transferring partial products to said indicating means at intermediate points of such stepping operations, the indicating means being free for motion independent of said product-transferring means at the end of each such stepping operation, and clearing means arranged when operated to disengage said feed means, to return the carriage and to return said product indicating means to zero position.

54. A computing machine comprising in combination a movable carriage, product-indicating means carried thereby and comprising a plurality of separately movable indicating members, said carriage having a feed rack, feed mechanism normally engaging said feed rack to step said carriage to one side progressively, means for transferring partial products to said indicating means, and clearing means arranged, when operated, to disengage said feed rack from the feed means, to return the carriage, and to return the indicating means to zero.

55. A computing machine comprising in combination a movable carriage, a plurality of separately rotatable product-indicating wheels carried thereby, means for transferring partial products to said indicating wheels, means for stepping said carriage to one side progressively, and clearing means arranged to return said carriage, and to rotate said indicating wheels to zero.

56. A computing machine comprising in combination a movable carriage, product-indicating means carried thereby comprising a plurality of indicating wheels rotatably mounted on said carriage, means for transferring partial products to said indicating means, means for stepping said carriage to one side progressively, and clearing means comprising means for the return of said carriage, and a catch normally preventing return of said indicating wheels to zero, but arranged to be released upon return of said carriage, said clearing means arranged to return said indicating wheels to zero upon release of such catch.

57. A computing machine comprising in combination a movable carriage having a rotatable shaft, a catch normally preventing rotation of such shaft, a plurality of separately rotatable indicating wheels on said shaft, means for transferring partial products to said indicating wheels, means for stepping said carriage progressively to one side, and clearing means arranged, when operated, to return the carriage, and means operated by the return of the carriage for releasing such catch, said clearing means comprising means for rotating said shaft after the release of such catch, said shaft comprising means for the return of the indicating wheels to zero when so rotated.

58. A computing machine comprising in combination a movable carriage having a shaft which is both rotatable and movable axially, a catch normally preventing rotation of such shaft, indicating wheels on said shaft, means for transferring partial products to said indicating wheels, disengageable feed means for stepping said carriage to one side progressively, a movable clearing lever arranged, when operated, to disengage said feed means, and then to return the carriage, means operated by the return of the carriage for moving said shaft axially and thereby releasing said catch, a rack and pinion adapted for rotating said shaft when so released, and gear means operated by said clearing lever for moving said rack, said shaft comprising means for returning said indicating wheels to zero position upon such rotation of the shaft.

59. A computing machine comprising in combination product members, a main operating device, indicating means, mechanism operated by said main operating device for transferring products to which such product members have been set to said indicating means, controllable mechanism for setting such product members, and means for transmitting motion from such operating device to such controllable mechanism comprising yield means whereby such controllable mechanism may operate through various predetermined ranges without interfering with full operation of the mechanism for transferring products from such product members to said indicating means.

60. A computing machine comprising in combination a movable carriage, indicating means carried thereby, mechanism comprising a bank of controlling keys for transferring various numbers to such indicating means, means for moving said carriage, and means operated by movement of the carriage for restoring to normal position such keys as may have been actuated.

61. A computing machine comprising in combination a movable carriage, indicating means carried thereby, multiplying mechanism comprising a bank of controlling keys, and means for transferring partial products to said indicating mechanism, and for feeding the carriage in one direction to give effect to the "place" of partial products so transferred, said carriage adapted to be returned, and means operated by the return of the carriage for restoring such of said keys as may have been actuated.

62. A computing machine comprising in combination a movable carriage, indicating means carried thereby, multiplying mechanism comprising a plurality of columns of controlling keys and means for transferring partial products to said indicating means, each of said key-columns comprising restoring means for the several keys of that column and a restoring member, operated by the actuation of any one of such keys, and adapted by return actuation, to restore the key which so actuated it, carriage feed mechanism arranged to feed the carriage in one direction to give effect to the "place" of partial products so transferred to said indicating means, a pawl carried by such carriage and yieldable in one direction, and means arranged to be engaged and actuated by said pawl during return of the carriage, and arranged when so engaged and actuated to actuate the restoring members of the various key columns.

63. A computing machine comprising in combination multiplicand-receiving means, multiplier-receiving means, multiplying mechanism controlled jointly by the multiplicand-receiving and multiplier-receiving means, and locking means which locks the multiplicand-receiving means at the beginning of operation of the multiplying mechanism, and holds such multiplier-receiving means locked until the conclusion of the multiplying operation, and then releases such multiplicand-receiving means.

64. A computing machine comprising in combination a plurality of columns of multiplicand keys, a multiplier-receiving means comprising a reciprocating member movable through varying ranges according to the value of the multiplier, multiplying mechanism controlled by said multiplicand keys and said multiplier-receiving device, and locking means for the multiplicand keys, operated by said reciprocating member at the beginning of its movement to lock said multiplicand keys and to hold same locked until the return of such reciprocating member.

65. A computing machine comprising in combination a movable carriage, indicating means carried thereby, gear means carried by said carriage for operating said indicating means, other gear means for transferring various numbers through such first mentioned gear means to said indicating means, the said two gear means being normally out of mesh, but arranged to be brought into mesh by movement of the carriage at the beginning of a computing operation, and automatic means for returning such carriage to first position at the end of such computing operation.

66. A combined multiplying and adding machine comprising in combination a multiplicand-receiving means, a multiplier-receiving means, multiplying mechanism comprising product members controlled jointly by such multiplicand and multiplier receiving means, a carriage, indicating means carried thereby, mechanism for transferring partial products to which such product members may be set to said indicating means, feed means adapted to shift the carriage and with it the indicating means to give proper effect to the "place" of successive partial products in such indicating means, and means for throwing such feed mechanism out of operation when the machine is to be used for addition by multiplication by unity of successive numbers set up in said multiplicand-receiving means, and transfer of the resulting products to said indicating means.

67. A combined multiplying and adding machine comprising in combination a multiplicand-receiving means, a multiplier-receiving means, multiplying mechanism comprising product members, means controlled jointly by said multiplicand-receiving means and multiplier-receiving means for setting said members to represent various products, a movable carriage, indicating means carried thereby, means, comprising gears normally out of mesh, for transferring partial products from said product members to said indicating means, feed means arranged to move said carriage to bring such gears into mesh at the beginning of a multiplying operation, and then to move said carriage onward until the gears are out of mesh, at the conclusion of such multiplication operation, other feed means arranged to move the carriage to bring said gears into mesh at the beginning of multiplication of a multiplicand by unity, and to restore the carriage to first position at the conclusion of such multiplication operation, and means for throwing one or the other of said carriage feed means into operation at will.

68. A combined multiplying and adding machine comprising in combination a multiplicand-receiving means, a multiplier-receiving means, multiplying mechanism comprising product members, means controlled jointly by said multiplicand-receiving means and multiplier-receiving means for setting said members to represent various products, a movable carriage, indicating means carried thereby, means, comprising gears normally out of mesh, for transferring partial products from said product members to said indicating means, feed means arranged to move said carriage to bring such gears into mesh at the beginning of a multiplying operation, and then to move said carriage onward until the gears are out of mesh, at the conclusion of such multiplication operation, other feed means arranged to move the carriage to bring said gears into mesh at the beginning of multiplication of a multiplicand by unity, and to restore the carriage to first position at the conclusion of such multiplication operation, means for throwing one or the other of said carriage feed means into operation at will, and means operated by such return of the carriage for the restoration of the multiplicand-receiving means to normal during each such restoration of the carriage.

69. In a computing machine, the combination of a longitudinally movable gear member, means for moving the same, numbered keys each arranged when depressed to engage such gear member to limit motion of the latter to an extent proportional to the numerical value of such key, said keys having capacity both for depression and for oscillation, restoring means for each such key adapted to restore same and also to cause oscillation of the key when the latter is depressed, a sliding locking plate arranged to lock down each key when so depressed by reason of the oscillation thereof incident to its depression, and to prevent depression of other of said keys while one of said keys is in depressed position, and a further restoring key arranged when actuated, to actuate said locking plate to release a key previously depressed and locked in depressed position by said locking plate.

70. A computing machine comprising in combination a movable gear member, a series of gears any one of which may be thrown into or out of mesh with said gear member, such series of gears divided into two sub-groups, the gears of one such sub-group having different pitch diameters, and connected to move all at the same angular velocity, the gear or gears of the other sub-group arranged to move at different angular velocity or velocities relative to the gears of the first sub-group.

71. A computing machine comprising in combination a column of numbered actuators, a movable gear member, a series of gears, corresponding each to one of said actuators, and any one of which gears may be thrown into or out of driving connection with said gear member by actuation of its corresponding actuator, such series of gears divided into two sub-series, the gears of one such group having different pitch diameters corresponding to the numerical values of their corresponding actuators and connected to move at the same angular velocity, the gear or gears of the other sub-group arranged to move at different angular velocity or velocities relative to the gears of the first sub-group, and being each of a pitch diameter greater than the pitch diameter which would correspond to the numerical value of its corresponding actuator at the ratio selected for the pinions of such first mentioned sub-group, and means for communicating motion to the gears of such two sub-groups, and for moving the gear or gears of the second mentioned sub-group at angular velocities proportionate to the numerical value or values of the actuator or actuators corresponding to such second sub-group gears.

72. A computing machine comprising in combination a column of numbered actuators, a movable gear member, a series of gears, corresponding each to one of said actuators, and any one of which gears may be thrown into or out of driving connection with said gear member by actuation of its corresponding actuator, such series of gears divided into two sub-series, one such sub-series consisting of gears having constant angular velocity, the other sub-series consisting of gears having different angular velocities, the relation of pitch diameters to angular velocity being such that the pitch line portions of the gears of the complete series shall be proportional to successive numerical integer values, the gears of one such sub group having different pitch diameters corresponding to the numerical values of their corresponding actuators, and connected to move all at the same angular velocity, the gear or gears of the other sub-group arranged to move at different angular velocity or velocities relative to the gears of the first sub-group, and being each of a pitch diameter greater than the pitch diameter which would correspond to the numerical value of its corresponding actuator at the ratio selected for the pinions of such first mentioned sub-group, and means for communicating motion to the gears of such two sub-groups, and for moving the gear or gears of the second mentioned sub-group at angular velocities proportionate to the numerical value or values of the actuator or actuators corresponding to such second sub-group gears.

73. A combined multiplying and adding machine comprising in combination a multiplicand-receiving means, a multiplier-receiving means comprising a member movable through various ranges corresponding to various multipliers, multiplying mechanism comprising multiplying members movable under joint control of said multiplicand and multiplier-receiving means to represent various partial products, product-indicating means, means for transferring partial products from such multiplying members to said product-indicating means, adding means for performing addition by multiplication by unity of various multiplicands set up in the multiplicand receiving means, and means for arresting at its position corresponding to unity the said movable member of the multiplier-receiving means.

74. A computing machine comprising in combination a column of numbered actuators, a movable gear member, a series of gears, corresponding each to one of said actuators, and any one of which gears may be thrown into or out of driving connection with said gear member by actuation of its correspondng actuators, such series of gears divided into two sub-series, one such sub-series consisting of gears having constant angular velocity, the other sub-series consisting of gears having different angular velocities, the relation of pitch diameters to angular velocity being such that the pitch line motions of the gears of the complete series shall be proportional to successive numerical integer values.

In testimony whereof I have signed this specification in the presence of two subscribing witnesses.

JOHN H. BARR.

Witnesses:
H. M. MARBLE,
PAUL H. FRANKE.